United States Patent
Chen et al.

(10) Patent No.: US 11,258,306 B2
(45) Date of Patent: Feb. 22, 2022

(54) SYSTEM AND METHOD FOR REACTANCE STEERING NETWORK (RSN)

(71) Applicant: The Trustees of Princeton University, Princeton, NJ (US)

(72) Inventors: Minjie Chen, Princeton, NJ (US); Ming Liu, Windsor, NJ (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 0 days.

(21) Appl. No.: 16/958,993

(22) PCT Filed: Dec. 28, 2018

(86) PCT No.: PCT/US2018/067845
§ 371 (c)(1),
(2) Date: Jun. 29, 2020

(87) PCT Pub. No.: WO2019/133803
PCT Pub. Date: Jul. 4, 2019

(65) Prior Publication Data
US 2020/0336020 A1    Oct. 22, 2020

Related U.S. Application Data

(60) Provisional application No. 62/681,750, filed on Jun. 7, 2018, provisional application No. 62/678,815, filed on (Continued)

(51) Int. Cl.
*H02J 50/40* (2016.01)
*H02J 50/12* (2016.01)
(Continued)

(52) U.S. Cl.
CPC .............. *H02J 50/40* (2016.02); *H02J 50/12* (2016.02); *H02M 3/155* (2013.01); *H02M 7/537* (2013.01)

(58) Field of Classification Search
CPC .. H02J 50/40; H02J 50/50; H02J 50/10; H02J 50/12; H02M 3/155; H02M 7/537; H01F 2038/143; H01F 38/14; H01F 27/38
See application file for complete search history.

(56) References Cited

U.S. PATENT DOCUMENTS

| 5,012,200 A | 4/1991 | Meinzer |
| 7,535,133 B2 | 5/2009 | Perreault et al. |

(Continued)

FOREIGN PATENT DOCUMENTS

WO    2013170173 A2    11/2013

OTHER PUBLICATIONS

International Search Report and Written Opinion for PCT/US2018/067845, dated Mar. 8, 2019.
(Continued)

*Primary Examiner* — Rexford N Barnie
*Assistant Examiner* — Brian K Baxter
(74) *Attorney, Agent, or Firm* — Meagher Emanuel Laks Goldberg & Liao, LLP

(57) ABSTRACT

According to various embodiments, a dual-band multi-receiver (DBMR) wireless power transfer (WPT) system is disclosed. The WPT system includes a transmitter including a first dc-dc converter coupled to a first inverter, a second dc-dc converter coupled to a second inverter, a reactance steering network (RSN) coupled to the first and second inverters, a high frequency transmitting coil coupled to the RSN, and a low frequency transmitting coil coupled to the first and second dc-dc converters. The WPT system further includes one or more receivers, each receiver including a high frequency receiving coil, a low frequency receiving coil, and a rectifier coupled to the high frequency receiving coil and low frequency receiving coil.

32 Claims, 34 Drawing Sheets

Related U.S. Application Data on May 31, 2018, provisional application No. 62/611,744, filed on Dec. 29, 2017.

(51) Int. Cl.
*H02M 3/155* (2006.01)
*H02M 7/537* (2006.01)

(56) References Cited

U.S. PATENT DOCUMENTS

| | | | |
|---|---|---|---|
| 8,957,727 B2 | 2/2015 | Dawson et al. | |
| 9,141,832 B2 | 9/2015 | Perreault et al. | |
| 9,172,336 B2 | 10/2015 | Briffa et al. | |
| 9,209,758 B2 | 12/2015 | Briffa et al. | |
| 2009/0116266 A1* | 5/2009 | Lai | H02M 7/493 363/40 |
| 2012/0119586 A1* | 5/2012 | Carralero | H02J 1/102 307/82 |
| 2013/0033118 A1* | 2/2013 | Karalis | H02J 50/50 307/104 |
| 2013/0077361 A1* | 3/2013 | Low | H02J 7/025 363/48 |
| 2013/0300209 A1* | 11/2013 | Long | H02J 50/10 307/104 |
| 2014/0268891 A1* | 9/2014 | Sigamani | H02M 3/285 363/17 |
| 2015/0115729 A1* | 4/2015 | Kanno | H02J 50/80 307/104 |
| 2015/0333536 A1* | 11/2015 | Ganem | H02J 50/60 307/104 |
| 2015/0351171 A1* | 12/2015 | Tao | F21K 9/278 315/185 R |
| 2016/0052423 A1 | 2/2016 | Zhou et al. | |
| 2016/0241087 A1* | 8/2016 | Bae | H02J 50/60 |
| 2016/0352152 A1 | 12/2016 | Karalis et al. | |
| 2016/0359369 A1* | 12/2016 | Jeong | H02J 50/12 |
| 2017/0014158 A1 | 1/2017 | Anderson | |
| 2017/0040688 A1* | 2/2017 | Peralta | H01Q 1/526 |
| 2017/0054213 A1* | 2/2017 | Singh | H04B 5/0087 |
| 2017/0141585 A1* | 5/2017 | Walley | H02J 50/12 |
| 2017/0294798 A1 | 10/2017 | Yuk et al. | |
| 2017/0338696 A1* | 11/2017 | Bae | H02J 50/00 |
| 2018/0097405 A1* | 4/2018 | Costinett | H02M 7/53871 |
| 2018/0166915 A1* | 6/2018 | Afridi | H02J 7/025 |
| 2018/0198322 A1* | 7/2018 | Mercier | H02J 50/12 |
| 2019/0089197 A1* | 3/2019 | Mao | H01F 3/14 |
| 2019/0190318 A1* | 6/2019 | Vital de Campos de Freitas | H01F 38/14 |
| 2020/0244174 A1* | 7/2020 | Kanakasabai | H02J 50/10 |

OTHER PUBLICATIONS

Liu, M., "Dual-Band Multi-Receiver Wireless Power Transfer with Reactance Steering Network", Article [online] Jun. 12, 2018.

Han., et al., "Resistance Compression Networks for Radio-Frequency Power Conversion". IEEE Transactions on Power Electronics, vol. 22, No. 1, pp. 41-53, Jan. 2007.

Sinha et al., "Active Variable Reactance Rectifier—A New Approach to Compensating for Coupling Variations in Wireless Power Transfer Systems", IEEE 18th Workshop on Control and Modeling for Power Electronics (COMPEL), Aug. 21, 2017.

Perreault, "A New Power Combining and Outphasing Modulation system for High-Efficiency Power Amplification", IEEE Transactions on Circuits and Systems-I:Regular Papers, vol. 58, No. 8, pp. 1713-1726, Aug. 2011.

Ahn, et al., "Wireless Power transfer With Concurrent 200-kHz and 6.78-MHz Operation in a Single-Transmitter Device", IEEE Transactions on Power Electronics, vol. 31, No. 7, pp. 5018-5029, Jul. 2016.

Zhao et al. "GaN-Based Dual-Mode Wireless Power Transfer Using Multifrequency Programmed Pulse Width Modulation", IEEE Transactions on Industrial Electronics, vol. 64, No. 11, pp. 9165-5029, Nov. 2017.

Kung et al., "Dual-Based Coil Module With Repeaters for Diverse Wireless Power Transfer Application", IEEE Transactions on Microwave Theory and Techniques, pp. 332-345, Jan. 2018.

Choi, et al., "Implementing an Impedance Compression Network to Compensate for Misalignments in a Wireless Power Transfer System", IEEE Transactions on Power Electronics, vol. 34, No. 5, pp. 4173-4184, May 2019.

* cited by examiner

Parameters of the Example Dual-Band Rectifier

| $L_{f1}$ | $C_{r1}$ | $L_{f2}$ | $C_{r2}$ | $C_{f1}$ | $C_{f2}$ |
|---|---|---|---|---|---|
| 1.2 μH | 500 pF | 1.2 μH | 500 pF | 20 μF | 20 μF |

The Parameters of the Coupling System

| $L_{tx,LF}$ | $r_{tx,LF}$ | $C_{tx,LF}$ | $L_{rx,LF}$ | $r_{rx,LF}$ | $C_{rx,HF}$ |
|---|---|---|---|---|---|
| 36 μH | 0.2 Ω | 70 pF | 36 μH | 0.2 Ω | 80 pF |
| $L_{tx,HF}$ | $r_{tx,HF}$ | $C_{tx,HF}$ | $L_{rx,HF}$ | $r_{rx,HF}$ | $C_{rx,HF}$ |
| 3 μH | 2 Ω | 40 pF | 1.2 μH | 0.5 Ω | 130 pF |

*FIG. 18*

Passive Component Values of the Dual-Band Transmitter

| $L_{f,C}$ | $L_{0,C}$ | $C_{S,C}$ | $C_{0,C}$ | $C_{RSN}$ | $C_1$ | $L_1$ |
|---|---|---|---|---|---|---|
| 200 nH | 1650 nH | 260 pF | 83 pF | 397 pF | 20 uF | 10 uH |
| $L_{f,L}$ | $L_{0,L}$ | $C_{S,L}$ | $C_{0,L}$ | $L_{RSN}$ | $C_2$ | $L_2$ |
| 200 nH | 1650 nH | 260 pF | 83 pF | 350 nH | 20 uF | 10 uH |

*FIG. 19*

SYSTEM AND METHOD FOR REACTANCE STEERING NETWORK (RSN)

CROSS-REFERENCE TO RELATED APPLICATIONS

This application claims priority to provisional applications 62/611,744, 62/678,815, and 62/681,750, filed Dec. 29, 2017, May 31, 2018, and Jun. 7, 2018, respectively, which are herein incorporated by reference in their entirety.

FIELD OF THE INVENTION

The present invention relates generally to power conversion systems and, more particularly, to a reactance steering network (RSN) for high frequency power conversion.

BACKGROUND OF THE INVENTION

Wireless power transfer (WPT) through near-field magnetic coupling is an enabling technology for many applications ranging from consumer electronics to electric vehicles. A few WPT standards have been established (e.g., AirFuel, Qi) with frequencies ranging from hundreds of kHz to a few MHz. These standards may merge and may cover many frequency domains in the future. In general, there is a fundamental tradeoff between kHz operation and MHz operation in WPT: MHz operation enables long distance power transfer and better robustness against coil misalignment, while kHz operation offers higher efficiency and higher power transfer capability. Both kHz and MHz WPT standards will co-exist for a long period of time. Many WPT equipped devices may co-locate in the same electromagnetic domain in many application scenarios (e.g., wireless powered desktop, wireless powered working bench). Future designs also need to be back-compatible with previous standards and need to be software upgradable (e.g., WPT in vehicles and robotics).

FIG. 1 illustrates a coil placement diagram for an applicable scenario involving wireless connections for powering, charging, and/or connecting to the Internet. The scenario involves at least one personal computer, tablet, and mobile device, but other IoT devices that support wireless charging may be added. The transmitting coils and the receiving coils may be loosely coupled or closely coupled. The load impedance on the transmitter side may change across a wide range. The transmitter needs to maintain high performance at both kHz and MHz, and the receivers need to receive power from multiple frequencies with a low component count.

Full-bridge-inverter-based topologies are widely considered as popular options at low frequencies (LF, e.g., 100 kHz). For high frequency (HF, e.g., 13.56 MHz) operation, maintaining resistive load for high frequency inverters (e.g., Class-E) is critical to achieve high performance. There exist many design techniques that can compress load resistance variation for single-switch MHz inverters. However, for reactance variation, the most commonly-adopted solution is to use a separate tunable matching network (TMN). The resolution of these compensation methods depends on the number of components used in the matching network. A variable reactance rectifier can help to address the challenge from the receiver side with full-bridge rectifiers, but the additional passive components and switching devices on the receiver side increase the volume and increase the cost of the receivers.

On the receiver side, active full-bridge rectifiers can offer high efficiency and high tolerance to impedance variation for 100 kHz operation. For MHz operation, Class-E based rectifiers are highly promising as they offer high performance with low component count and low total harmonic distortion (THD). Since receivers are usually co-packaged with portable devices or in electric vehicles with size and thermal limits, low component count and small size are highly preferred.

As such, there is a need for high performance multi-band transmitters that can power multiple receivers at different frequencies, and low component count multi-band receivers that can receive power from a variety of transmitters.

SUMMARY OF THE INVENTION

According to various embodiments, a transmitter for a dual-band multi-receiver (DBMR) wireless power transfer (WPT) system is disclosed. The transmitter includes a first branch including a first dc-dc converter coupled to a first inverter. The transmitter further includes a second branch including a second dc-dc converter coupled to a second inverter. The transmitter also includes a reactance steering network (RSN) coupled to the first and second inverters, a high frequency coil coupled to the RSN, and a low frequency coil coupled to the first and second dc-dc converters.

According to various embodiments, a dual-band multi-receiver (DBMR) wireless power transfer (WPT) system is disclosed. The WPT system includes a transmitter including a first dc-dc converter coupled to a first inverter, a second dc-dc converter coupled to a second inverter, a reactance steering network (RSN) coupled to the first and second inverters, a high frequency transmitting coil coupled to the RSN, and a low frequency transmitting coil coupled to the first and second dc-dc converters. The WPT system further includes one or more receivers, each receiver including a high frequency receiving coil, a low frequency receiving coil, and a rectifier coupled to the high frequency receiving coil and low frequency receiving coil.

According to various embodiments, a receiver for a dual-band multi-receiver (DBMR) wireless power transfer (WPT) system is disclosed. The receiver includes a high frequency receiving coil and a low frequency receiving coil. The receiver further includes a rectifier coupled to the high frequency receiving coil and low frequency receiving coil, the rectifier including a switch for high frequency or low frequency mode selection.

Various other features and advantages will be made apparent from the following detailed description and the drawings.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only exemplary embodiments of the invention and are not, therefore, to be considered to be limiting its scope, the invention will be described and explained with additional specificity and detail through the use of the accompanying drawings, in which:

FIG. 18 is a table of parameters of a coupling system according to an embodiment of the present invention;

FIG. 19 is a table of passive component values of a dual band transmitter according to an embodiment of the present invention;

DETAILED DESCRIPTION OF THE INVENTION

Wireless power transfer (WPT) via near-field magnetic coupling is an enabling technology for many applications. A few WPT standards are under development with frequencies ranging from kHz to MHz. MHz operation offers smaller size and higher tolerance to coil misalignment, and kHz operation offers higher efficiency and higher power rating. Generally disclosed herein is a dual-band WPT architecture with novel transmitter and receiver topologies that can achieve high performance at both 100 kHz and 13.56 MHz with low component count and decoupled power delivery. On the transmitter side, an enhanced push-pull Class-E topology together with a reactance steering network (RSN) is disclosed which can seamlessly compensate the load impedance variation for MHz wireless power transmitters. The dual-band transmitter can simultaneously and independently transmit power at the two frequencies. On the receiver side, a reconfigurable dual-band rectifier that can achieve a power density of 300 W/in$^3$ with very low component count and low total harmonic distortion (THD) is disclosed. A prototype dual-band WPT system including a RSN-based dual-band transmitter and multiple reconfigurable receivers has been built and tested. The WPT system can simultaneously deliver a total of 30 W of power to multiple receivers (15 W maximum each) with 83% efficiency at 100 kHz and 77% efficiency at 13.56 MHz with 2.8 cm of coil distance and up to 5 cm of coil misalignment.

Generally disclosed herein are topologies and architectures for dual-band WPT to achieve high performance with low component count. By merging the high frequency and low frequency circuits and reusing the switches and passive components, mutual advantages are created. On the transmitter side, a reactance steering network (RSN) enabled dual-band transmitter is disclosed which can independently modulate the power delivered at two frequencies. By adding one additional inductor and capacitor to a push-pull Class-E inverter, the RSN-based topology can maintain high performance across a very wide load impedance range. On the receiver side, a reconfigurable dual-band receiver is disclosed that can maintain high performance at both frequencies with very low component count. The receiver functions as a synchronous half-bridge rectifier at 100 kHz, and functions as two series-stacked Class-E rectifiers at 13.56 MHz. The two active switches and many passive components are reused at both frequencies. The transmitter and the receiver are merged as one WPT system that can operate at two frequencies while maintaining high performance. A prototype RSN transmitter can simultaneously deliver 30 W of power to multiple dual-band receivers (20 W maximum each) with 77% peak efficiency at 13.56 MHz, and 83% peak efficiency at 100 kHz with significant coil misalignment.

Figure 1:
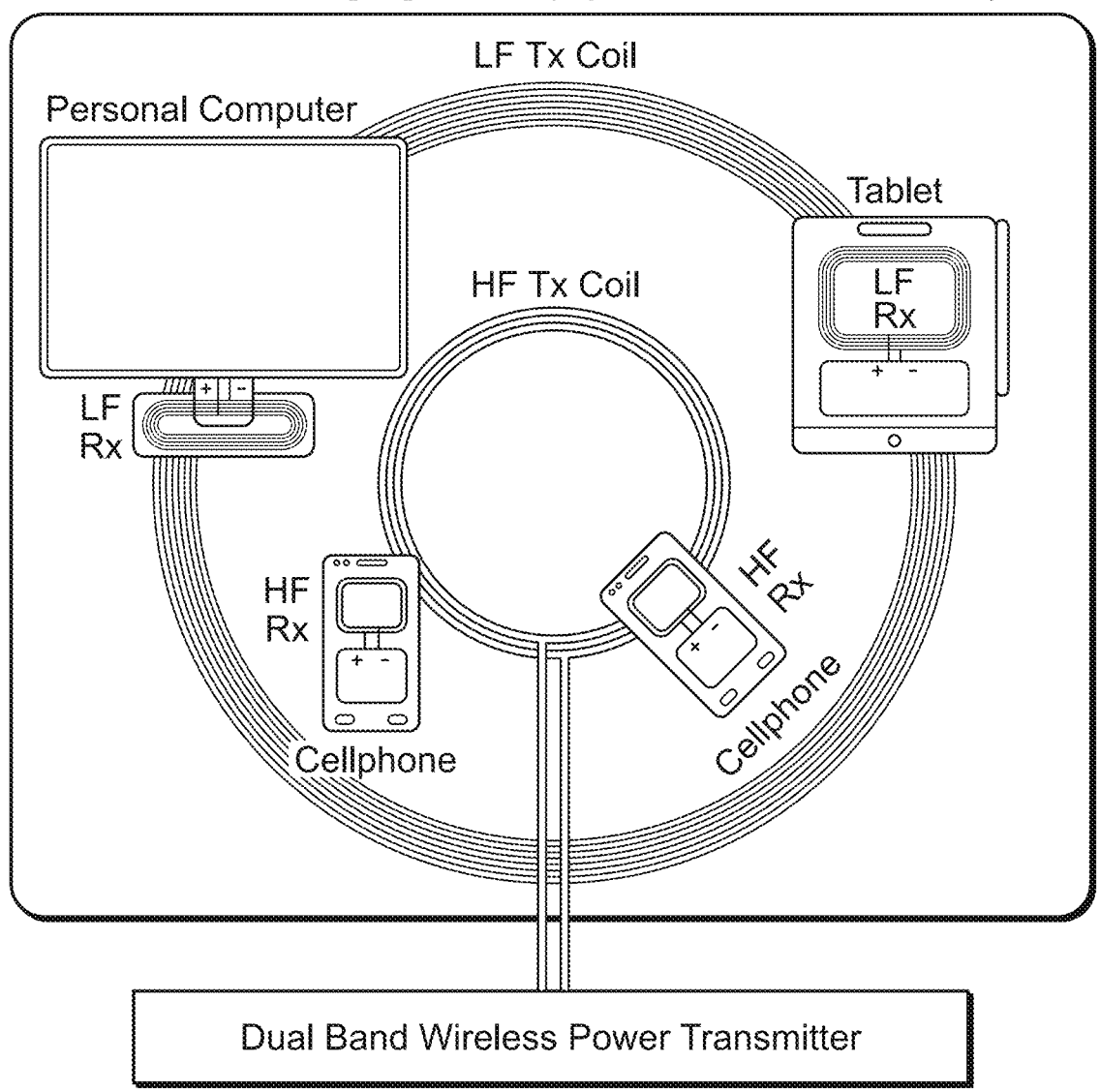
FIG. 1 is an application scenario of a dual-band multi-receiver WPT system according to an embodiment of the present invention.
Figure 2:
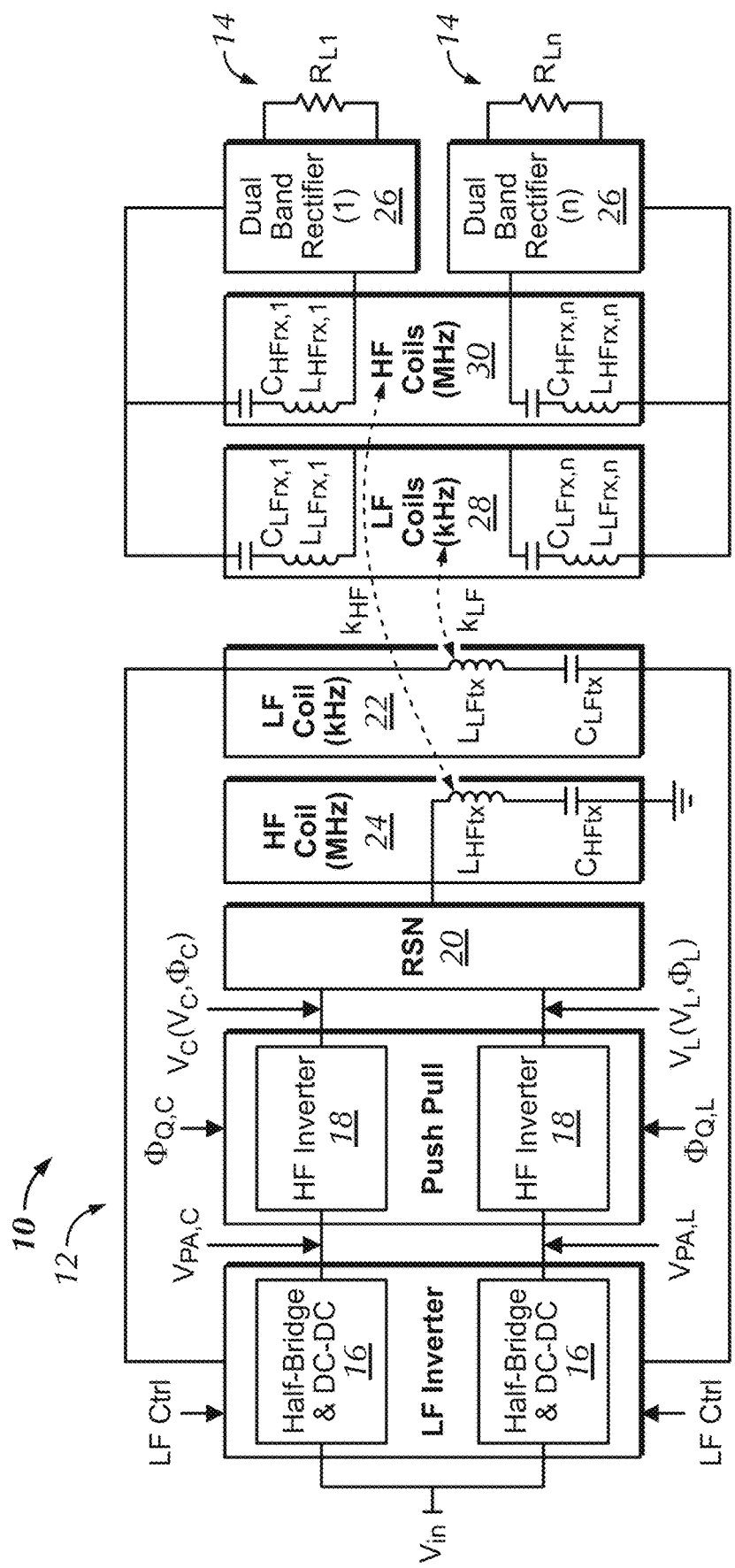
FIG. 2 is a block diagram of a dual-band multi-receiver WPT architecture according to an embodiment of the present invention.

FIG. 2 shows a block diagram of a proposed dual-band WPT system 10 including a RSN-based transmitter 12 and multiple reconfigurable dual-band receivers 14. The RSN transmitter 12 includes two low frequency (LF) dc-dc converters 16 operating at kHz (e.g., about 100 kHz, about 90-200 kHz), a modified push-pull Class-E inverter operating at MHz (e.g., about 6.78 MHz, about 13.56 MHz, about 27.12 MHz, about 6.78-27.12 MHz) formed by two HF inverters 18 and a RSN 20, a LF transmitting coil 22, and a HF transmitting coil 24. The receiver side includes multiple dual-band receivers 14 including dual band rectifiers 26. The rectifiers 26 may also be single band in alternative embodiments. The receivers 14 include a LF receiving coil 28 and a HF receiving coil 30.

The two dc-dc converters 16 modulate the two inputs 18 of the modified push-pull Class-E inverter, and simultaneously drive the LF transmitting coil 22 at 100 kHz. By modulating the voltage amplitude and the phase of the two HF inverters 18, the two Class-E inverter branches see pure resistive load. The dc-dc converters 16 also drive the LF transmitting coil 22 as a phase-shift full bridge, transferring power at both LF and HF simultaneously.

Each functional block in the RSN-based transmitter 12 can be implemented in multiple ways. Each dc-dc converter 16 can include a half-bridge LF inverter and LC low pass filter. The LF inverters can be implemented as Class-D or full-bridge inverters. The low-pass filters at the output of the LF inverters can be implemented as L-networks or π-networks. The push-pull inverters 18 can be implemented as Class-E, Class-F or Class-Φ inverters. The RSN 20 can be implemented as a three-port LC network or other three-port network options. The LF transmitting coil 22, HF transmitting coil 24, LF receiving coil 28, and HF receiving coil 30 are standard coils tuned for nominal coupling coefficients. The two dc-dc converters 16 drive the LF coil 22, and the two HF inverters 18 drive the HF coil 24. The power delivered at the two frequencies can be modulated independently.

The receiver 14 can be a dual-band reconfigurable receiver that can operate at either 100 kHz or 13.56 MHz. The receiver 14 functions as two series-stacked Class-E rectifier at 13.56 MHz, and functions as a half-bridge rectifier at 100 kHz. It has a low component count and can maintain high performance at both frequencies. A single dual-band receiver 14 can be reprogrammed to function at either frequency, and multiple receivers 14 working at different frequencies can be placed in adjacent to each other while all maintaining high performance. The transmitter 12 sees the impedance of all receivers 14 operating at two frequencies with their power added together.

Finally, the RSN-based transmitter 12 and the dual-band reconfigurable receiver 14 are merged together as a complete dual-band WPT system 10 that operate at both frequencies. The transmitter 12 can dynamically estimate the lumped load impedance and individually modulate the power delivered at each frequency.

Figure 3:
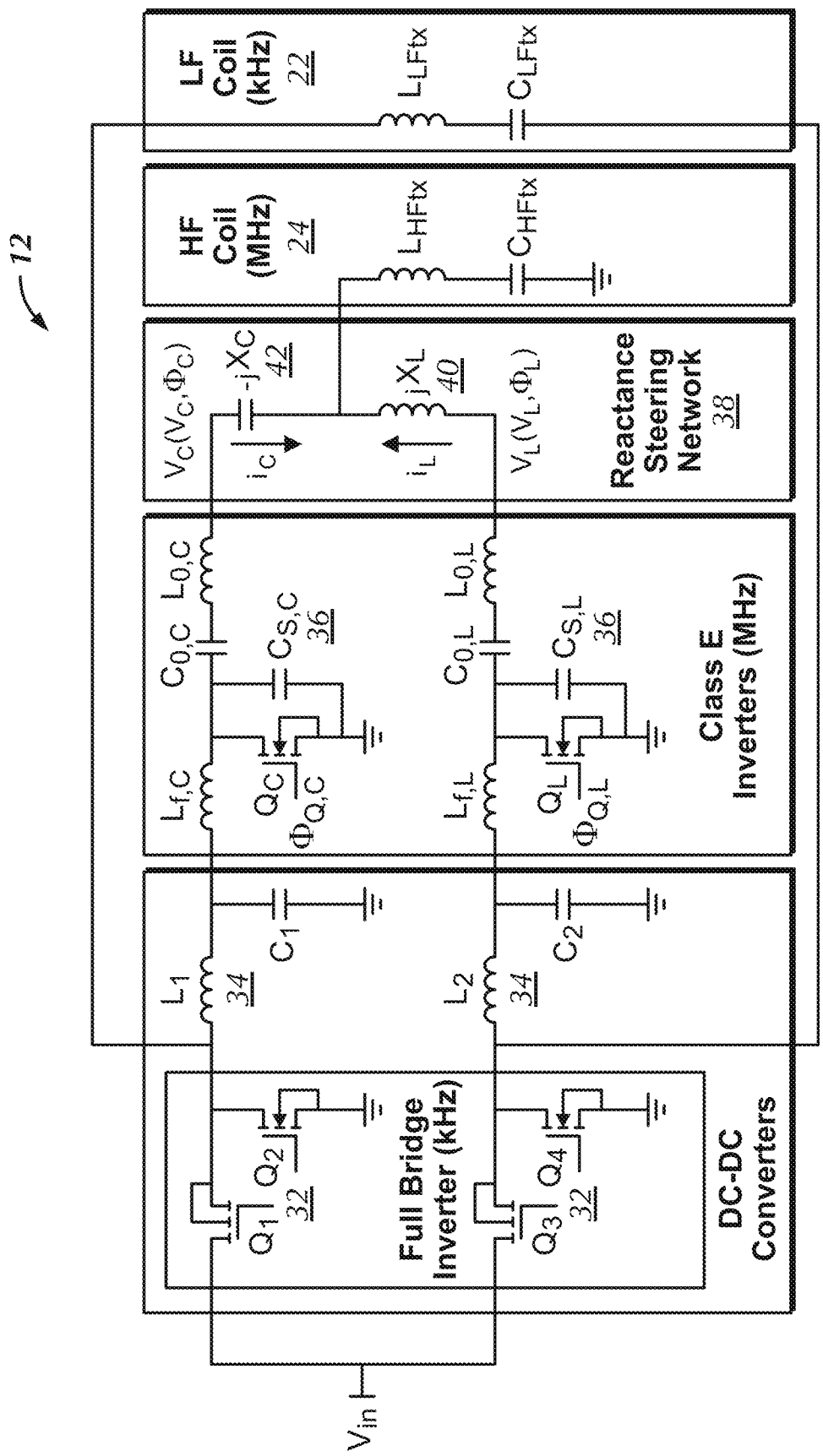
FIG. 3 is a schematic of a DBMR system according to an embodiment of the present invention.

FIG. 3 shows the schematic of an example implementation of the RSN based dual-band transmitter 12. The transmitter 12 includes two half-bridge LF inverters 32, two LC low pass filters 34, and two HF Class-E inverters 36. The two half-bridge inverters 32 and the two low-pass filters 34 function as two buck converters that modulate the inputs of the two Class-E inverters 36. The two Class-E inverters 36 are loaded with a LC resonant network 38 including an inductive branch $jX_L$ 40 and a capacitive branch $-jX_C$ 42. The two Class-E inverters 36 and the LC resonant network 38 can be interpreted as a modified push-pull Class-E inverter. The two half-bridge inverters 32 also drive a low frequency coil as a full bridge inverter.

This RSN transmitter 12 has the same component count as a traditional full-bridge inverter for LF operation and a push-pull Class-E inverter for HF operation. A key innovation of this design is merging the LF and HF operation together while maintaining resistive loading of the HF inverters against coil misalignment.

Figure 4:
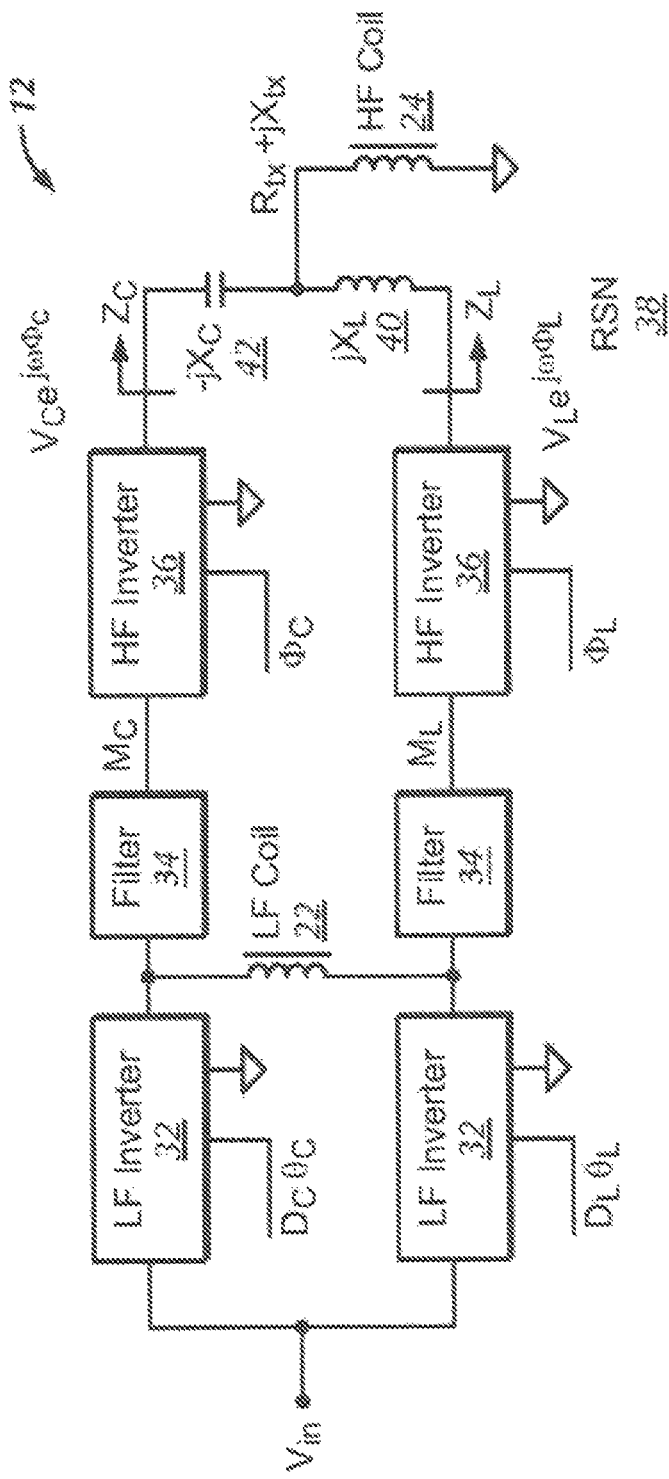
FIG. 4 is a block diagram of an RSN architecture according to an embodiment of the present invention.

FIG. 4 shows a simplified block diagram of the dual band transmitter 12 with a RSN 38 connected between the Class-E inverters 36 and the HF coil 24. The reactance steering network 38 is a three terminal network including an inductor and a capacitor. Derived from Resistance Compression Network (RCN), out-phasing, and Impedance Compression Network (ICN) concepts, with modulated inverter dc inputs, the RSN 38 splits the power flow to compensate the load impedance variation, so that the HF inverters 36 can operate efficiently across a wide impedance range.

This architecture has six control variables: $D_C$ and $D_L$ are the duty ratios of the two LF inverters 32; $\theta_C$ and $\theta_L$ are the phases of the two dc-dc converters; $\Phi_C$ and $\Phi_L$ are the phases of the two HF inverters 36. The two intermediate dc voltages $M_C$ and $M_L$ are controlled by $D_C$ and $D_L$. To simplify the analysis, it is assumed $X_C = X_L = X_O$ and model the two HF inverters 36 as two ac voltage sources: $V^*_C = V_C e^{j\Phi_C}$ and $V_L^* = V_L e^{j\Phi_L}$. The amplitudes ($V_L$, $V_C$) and phases ($\Phi_L$, $\Phi_C$) can be independently modulated. Applying superposition rules, the effective load impedance of the two HF inverter branches, $Z_C$ and $Z_L$, are explicit functions of $X_O$, $R_{tx}$, $X_{tx}$, and $K^*_{LC}$:

$$Z_C = \frac{X_O^2}{R_{tx} - K^*_{LC} R_{tx} + (X_{tx} + X_O - K^*_{LC} X_{tx})j}, \quad (1)$$

$$Z_L = \frac{X_O^2}{R_{tx} - \frac{1}{K_{LC}^*}R_{tx} + \left(X_{tx} - X_O - \frac{1}{K_{LC}^*}X_{tx}\right)j} \quad (2)$$

$K^*_{LC}$ is the complex voltage ratio between the inductive branch 40 and capacitive branch 42:

$$K_{LC}^* = \frac{V_L}{V_C}e^{j(\Phi_L - \Phi_C)}.$$

To ensure pure resistive $Z_C$ and $Z_L$, the following is needed:

$$K_{LC} = \quad (3)$$
$$\frac{V_L}{V_C} = \frac{X_{tx}\cos(\Delta_{LC}) - R_{tx}\sin(\Delta_{LC})}{X_{tx} - X_O} = \frac{X_{tx} + X_O}{X_{tx}\cos(\Delta_{LC}) + R_{tx}\sin(\Delta_{LC})}$$

$$\sin^2(\Phi_L - \Phi_C) = \sin^2(\Delta_{LC}) = \frac{X_O^2}{X_{tx}^2 + R_{tx}^2}. \quad (4)$$

Here, $\Delta_{LC} = \Phi_L - \Phi_C$ is the phase difference between the two HF inverters 36. For a load impedance range $R_{tx} \in [R_{min}, R_{max}]$, $X_{tx} \in [X_{min}, X_{max}]$, $X_O$ should be selected such that $X_O^2 \leq (X_{tx}^2 + R_{tx}^2)$ holds true across the entire $R_{tx}$ and $X_{tx}$ range, so that there is a solution for $\Delta_{LC}$. For each pair of $R_{tx}$ and $X_{tx}$, there are four feasible solutions for $K^*_{LC}$, one located in each quadrant. Due to phase and polarity symmetry, the solution in the $1^{st}$ quadrant is equivalent to the solution in the $3^{rd}$ quadrant; and the solution for the $2^{nd}$ quadrant is equivalent to the solution in the $4^{th}$ quadrant. A first quadrant solution of $K^*_{LC}$ is usually preferable because keeping $\Delta_{LC}$ close to zero can minimize the converter stress. The optimal solutions for $K_{LC}$ and $\Delta_{LC}$ are:

$$K_{LC} = \left|\frac{V_L}{V_C}\right| = \frac{X_{tx} + X_O}{X_{tx}\cos(\Delta_{LC}) + R_{tx}\sin(\Delta_{LC})}. \quad (5)$$

$$\Delta_{LC} = \Phi_L - \Phi_C = \arcsin\sqrt{\frac{X_O^2}{X_{tx}^2 + R_{tx}^2}}. \quad (6)$$

For a typical voltage source inverter, $V_L$ is linearly proportional to $M_L$ and $D_L$, and $V_C$ is linearly proportional to $M_C$ and $D_C$. As a result, pure-resistive loading of the two HF inverters 36 can be achieved by modulating $D_C$, $D_L$, $\Phi_C$, and $\Phi_L$. The control strategy for these variables are:

If $Z_{tx}$ is resistive, the two HF inverters 36 equally share power and both see pure resistive load.

If $Z_{tx}$ is inductive, the system steers power towards the capacitive branch 42. The capacitive element $-jX_C$ is used to compensate the inductive load $Z_{tx}$.

If $Z_{tx}$ is capacitive, the system steers power towards the inductive branch 40. The inductive element $jX_L$ is used to compensate the capacitive load $Z_{tx}$.

Figure 5:
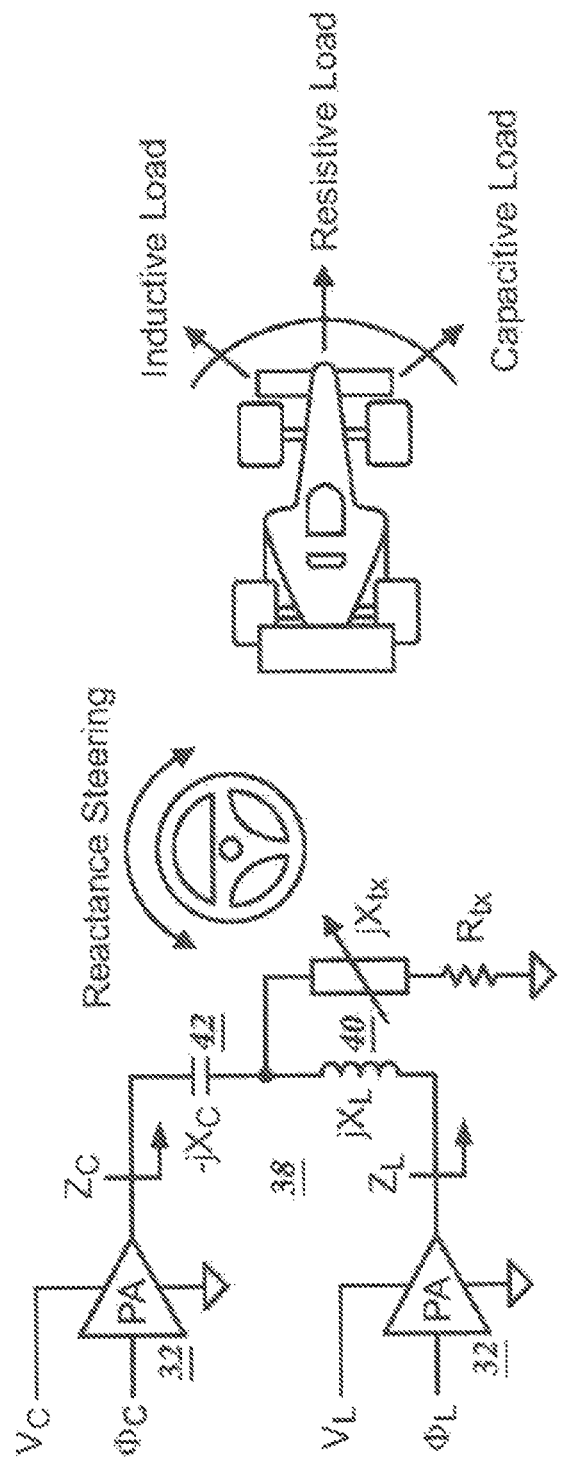
FIG. 5 is a diagram of operation principles of an RSN architecture according to an embodiment of the present invention.

FIG. 5 illustrates the principles of the reactance steering network 38. The amplitude and phase modulation of the two HF inverters 36 (power amplifiers) steer power between the two branches of the RSN 38 and dynamically compensate for the load reactance variation.

Figure 6:
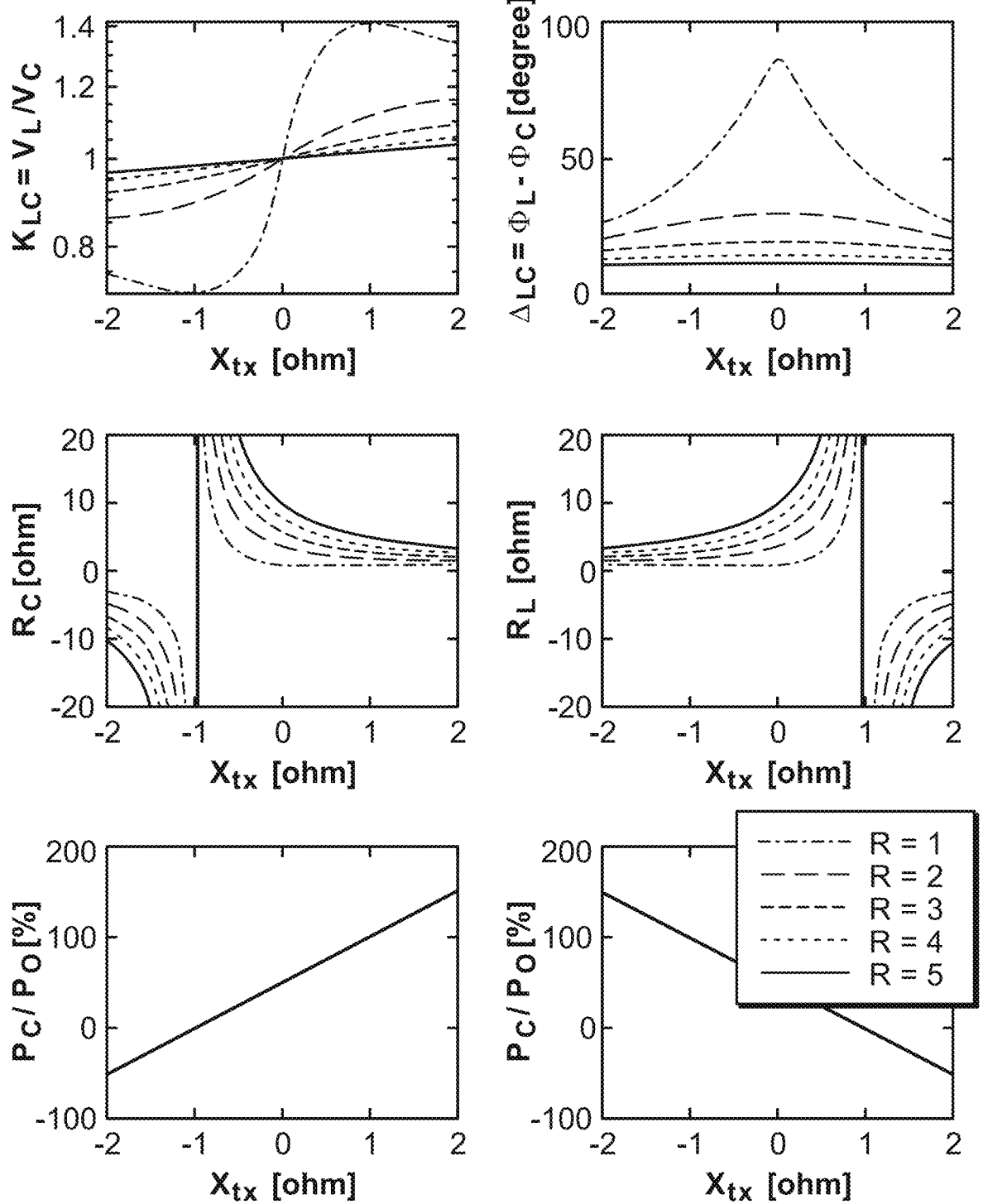
FIG. 6 is a number of graphs related to an RSN architecture according to an embodiment of the present invention.

The design of an example RSN system is quantitatively presented in detail. Assume $R_{tx}$ varies from 1Ω to 5Ω; $X_{tx}$ varies from -2jΩ to 2jΩ; and $X_O$ is selected as 1jΩ. Based on KCL and KVL, the effective resistance seen at the inductive branch 40 ($R_L$) and capacitive branch 42 ($R_C$) can be calculated based on Eq. (1) and Eq. (2), respectively. $R_L$ and $R_C$ can be used to estimate the power sharing between the two branches. The top four graphs in FIG. 6 show the $K_{LC}$, $\Delta_{LC}$, $R_L$, and $R_C$ as functions of $R_{tx}$ and $X_{tx}$. A voltage amplitude ratio adjustable from $1/\sqrt{2}$ to $\sqrt{2}$, and a phase shift adjustable from 0° to 90° can cover an arbitrary load impedance range.

Figure 7:
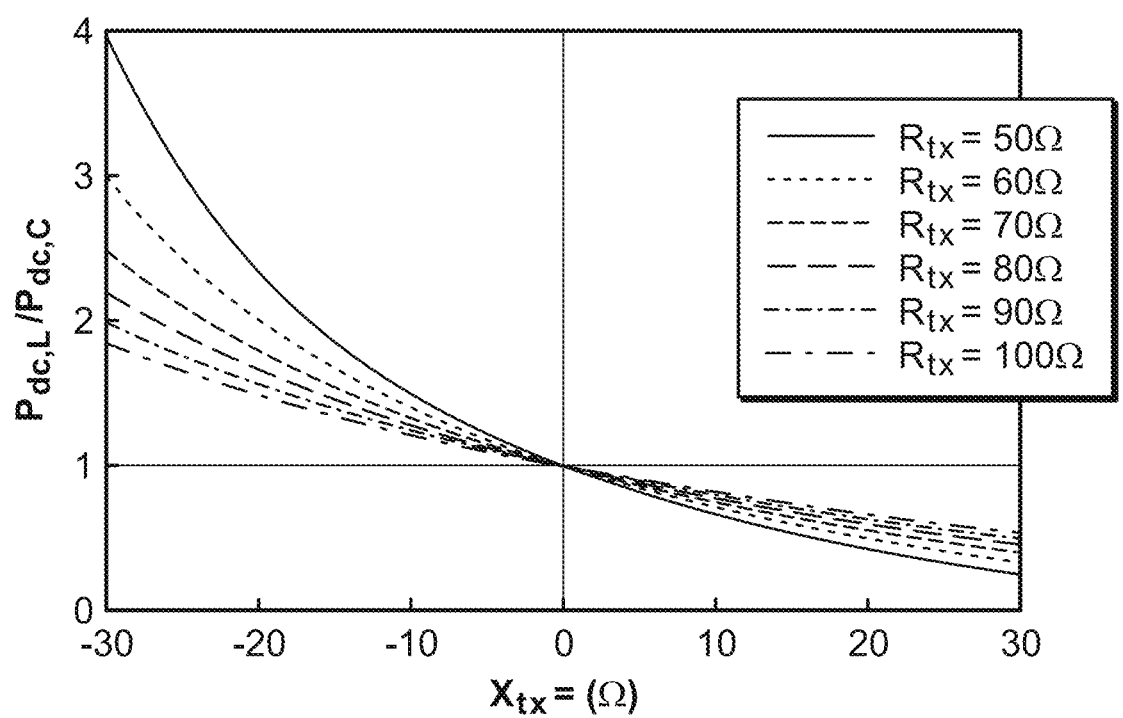
FIG. 7 is a graph of power ratio as a function of load impedance according to an embodiment of the present invention.

As shown in FIG. 7, with an inductive load ($X_{tx} > 0$), $V_L$ should be larger than $V_C$ to deliver more power through the capacitive branch 42; with a capacitive load ($X_{tx} < 0$), $V_L$ should be smaller than $V_C$ to deliver more power through the inductive branch 40. When $|X_{tx}| \leq |X_O|$, both $R_L$ and $R_C$ are higher than the overall load resistance, indicating that the two HF inverter branches are sharing power. When $|X_{tx}| > |X_O|$ (i.e., the load reactance is very high), one of $R_L$ and $R_C$ is smaller than the overall load resistance, and the other one is negative, indicating that there exists circulating power between the two branches. In other words, when needed on inverter branch functions as a rectifier to compensate the reactance variation.

The bottom two graphs in FIG. 6 show the percentage of the power sharing between the inductive branch 40 and capacitive branch 42 for this example RSN design. As expected, with pure resistive loads (i.e., $X_{tx} = 0$), the two branches evenly share power (50% each branch). With capacitive loads ($X_{tx} < 0$), the inductive branch 40 delivers more power than the capacitive branch 42. With inductive loads ($X_{tx} > 0$), the capacitive branch 42 delivers more power than the inductive branch 40. With very high capacitive loads ($X_{tx} < -X_O$), power circulates from the inductive branch 40 to the capacitive branch 42. With very high inductive loads ($X_{tx} > -X_O$), power circulates from the capacitive branch 42 to the inductive branch 40.

The reactance steering network can be implemented in many different ways depending on the applications. Generally speaking, the system steers power towards the inductive branch 40 or capacitive branch 42 to seamlessly compensate the reactance variation. Both the two HF inverters 36 see pure resistive load.

Compared to conventional designs, the proposed RSN architecture has the following advantages:

It can seamlessly compensate an arbitrary load impedance range and maintain pure resistive load.

It requires very few additional components compared to a push-pull Class-E inverter.

It has smooth transient behavior without mode-switching spikes or harmonics.

The dc-dc converters in the RSN are reused to drive a LF transmitter.

Load impedance estimation allows WPT systems to operate at maximum power point and maintain high efficiency. Sophisticated ac voltage and/or current sensing circuitry is usually needed in existing high frequency designs. The unique configuration of the RSN architecture allows low cost load impedance estimation for WPT without ac voltage/current sensors. The load impedance can be estimated with simple circuitry by comparing the dc power delivered by the two inverter branches. Based on Eq. (1) and Eq. (2), the input dc power of the two inverter branches, $P_C$ and $P_L$, are $$P_C = \frac{V_C^2(R_{tx} - K_{LC}(R_{tx}\cos(\Delta_{LC}) - X_{tx}\sin(\Delta_{LC})))}{2X_O^2}, \quad (7)$$

-continued $$P_L = \frac{V_L^2\left(R_{tx} - \frac{1}{K_{LC}}(R_{tx}\cos(\Delta_{LC}) + X_{tx}\sin(\Delta_{LC}))\right)}{2X_O^2}. \quad (8)$$

The ratio of the power delivered by the two branches is:

$$\frac{P_L}{P_C} = K_{LC}^2 \frac{\eta_C\left(R_{tx} - \frac{1}{K_{LC}}(R_{tx}\cos(\Delta_{LC}) + X_{tx}\sin(\Delta_{LC}))\right)}{\eta_L(R_{tx} - K_{LC}(R_{tx}\cos(\Delta_{LC}) - X_{tx}\sin(\Delta_{LC})))}. \quad (9)$$

Here, $\eta_L$ and $\eta_C$ are the efficiencies of the two dc-dc converters. Eq. (9) indicates that the load impedance $R_{tx}$ and $X_{tx}$ are closely related to the input dc power ratio $$\frac{P_L}{P_C}$$

for a given $\eta_L$, $\eta_C$, $K_{LC}$, and $$\Delta_{LC} \cdot \frac{P_L}{P_C}$$

can be measured from the dc-dc converters with a simple circuit and low cost.

FIG. 7 plots the relationship between the input dc power ratio $$\frac{P_L}{P_C}$$

and load impedance $Z_{tx}=R_{tx}+jX_{tx}$ for $K_{LC}=1$ and $\Delta_{LC}=90°$. The load resistance can be estimated with the total input power $P_L+P_C$ and the voltage amplitudes. Assume the efficiencies of the two HF inverter branches are the same, the load input impedance $X_{tx}$ can be estimated with $$\frac{P_L}{P_C}$$

using the graph in FIG. 7.

Figure 8:
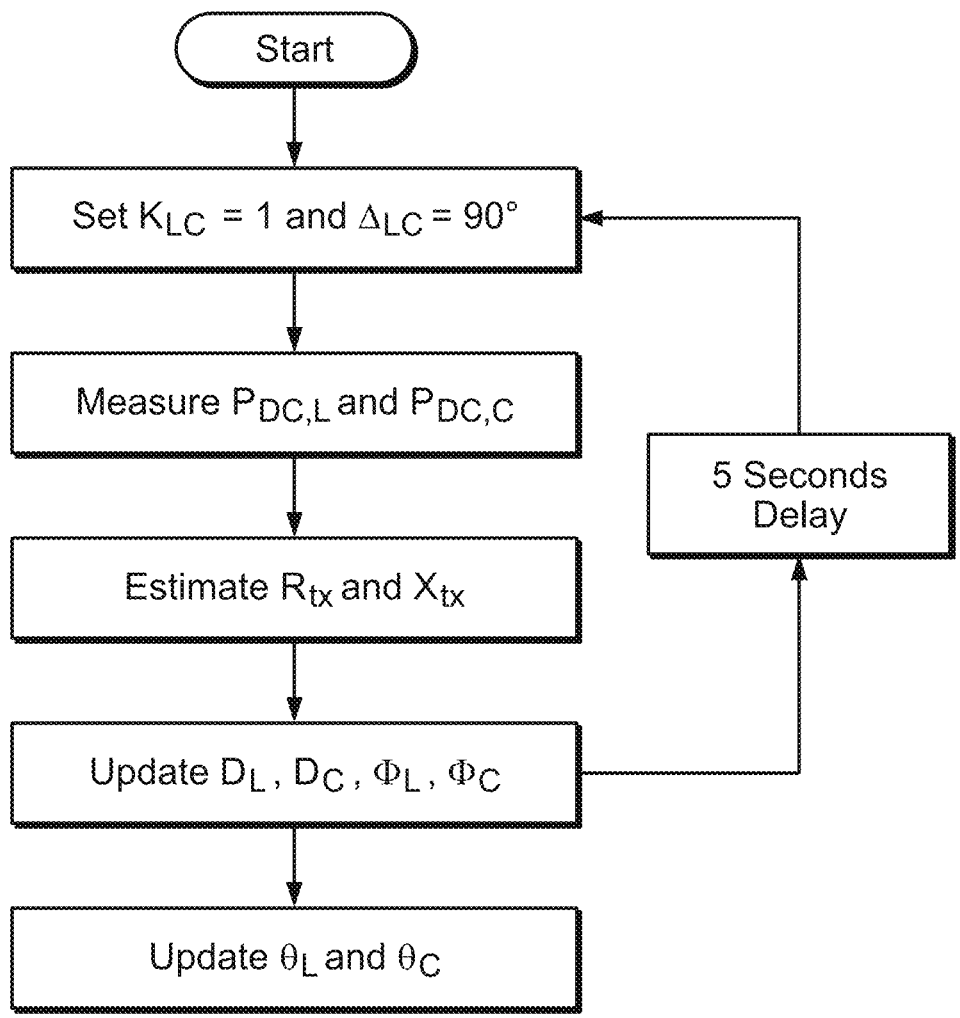
FIG. 8 is a control flow chart of an impedance estimation process according to an embodiment of the present invention.

FIG. 8 shows a control flow chart of the RSN-based transmitter 12. In the RSN-based control, the input power of the L branch 40 and C branch 42 are sampled and the power ratio is calculated. Through a look-up table, the desired duty cycles ($D_L$ and $D_C$) and the driving phases ($\phi_L$ and $\phi_C$) can be obtained to control the dc-dc converters 32, 34 and Class-E inverters 36 based on the calculated power ratio $P_{dc,L}$ and $P_{dc,C}$.

Figure 9:
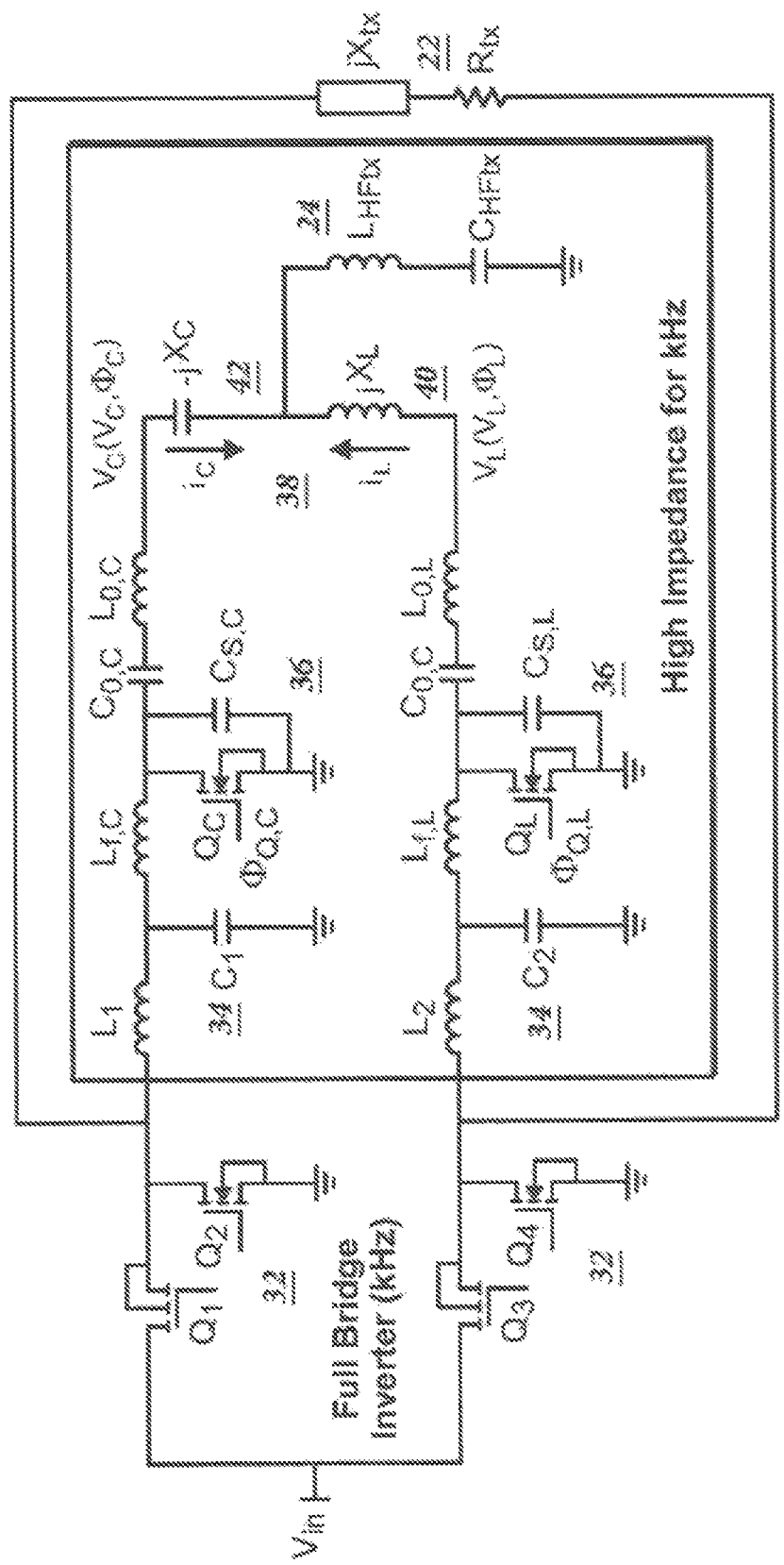
FIG. 9 is a schematic of a DBMR WPT system according to an embodiment of the present invention.

One way to implement the two dc-dc converters 32, 34 is to build them as two buck converters with two half-bridge inverters 32 as illustrated in FIG. 4. The two half-bridge inverters 32 can drive a LF coil 22 as a phase-shifted full bridge, while at the same time modulate the dc voltages $M_C$ and $M_L$ for the HF inverters 36. The LF power transfer is controlled by the phase of the two LF inverters 32 $\theta_L$ and $\theta_C$. The output $M_L$ and $M_C$ are controlled by $D_L$ and $D_C$. FIG. 9 shows the schematic of the dual-band transmitter with the RSN high frequency transmitter shaded. Here, $R_{tx}$ and $X_{tx}$ are the resistance and reactance of the low frequency coils. In this circuit, $Q_1$ and $Q_2$ operate as one phase-shifted half-bridge, and $Q_3$ and $Q_4$ operate as the other phase-shifted half-bridge. The duty ratios of the two half-bridges modulate $M_C$ and $M_L$, and the phase difference between the two half-bridges modulates the power output of the LF transmitter.

Benefiting from the low pass filters at the output of the dc-dc converters and the input inductors of the Class-E inverters, the power delivered by the LF transmitter and the HF transmitter are well-decoupled from each other. $\theta_L$ and $\theta_C$ modulate the LF transmitter, but have no impact on $M_L$ and $M_C$, and thus have no impact on the power delivery of the HF transmitter. Similarly, $\phi_C$ and $\phi_L$ modulate the HF transmitter, but have no impact on the LF transmitter. When $D_C$ and $D_L$ are adjusted to modulate $M_C$ and $M_L$, $\theta_C$ and $\theta_L$ should be changed accordingly to maintain the power levels of the LF transmitter. The two overlapped transmitter coils and the related resonant tanks are optimally tuned for 100 kHz and 13.56 MHz, respectively, though other frequencies are possible in alternative embodiments.

In many application scenarios, a wireless power receiver may need to be compatible with multiple standards. The receivers also need to be compact and efficient with low component count. A full bridge synchronous rectifier can work at both high frequencies and low frequencies. However, the square-wave harmonic contents of the full bridge rectifier raise concerns for many portable applications. It is also difficult to drive the high-side switches in a full-bridge rectifier. One can use Class-E rectifiers at high frequencies to reduce the harmonic contents, but the inductance of the chock inductor is usually large.

Figure 10A:
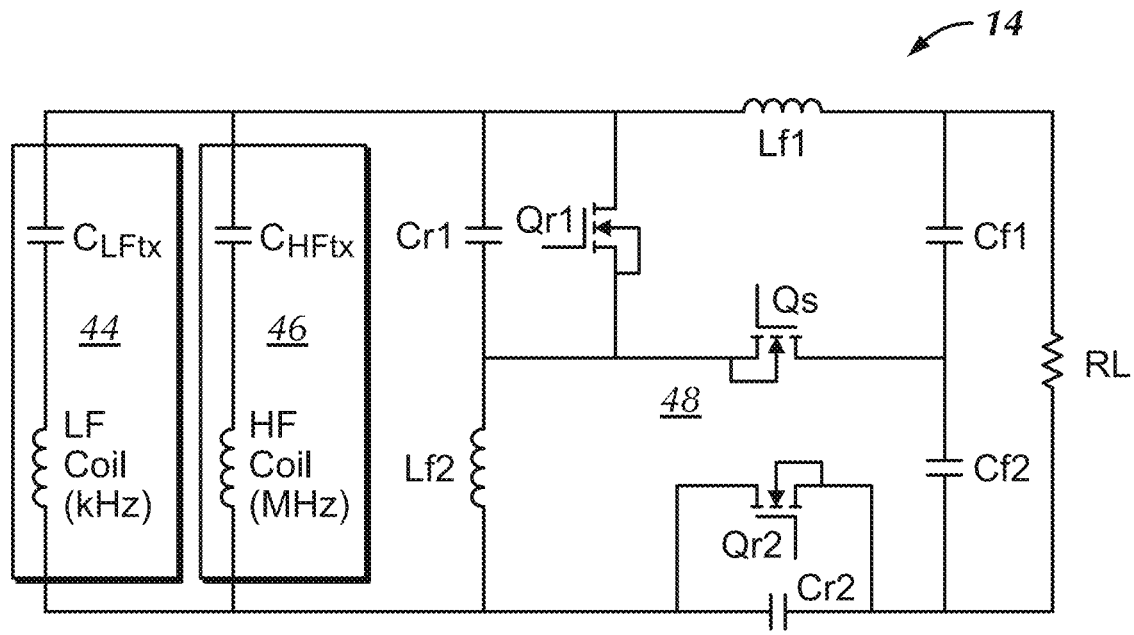
FIG. 10A is a dual band rectifier configuration according to an embodiment of the present invention.

FIG. 10A shows the topology of a dual-band reconfigurable receiver 14 according to an embodiment of the present invention. The receiver 14 includes a LF receiving coil 44, a HF receiving coil 46, and a rectifier 48. The rectifier 48 includes two switches $Q_{r1}$ and $Q_{r2}$ functioning as synchronous diodes, two shunt capacitors $C_{r1}$ and $C_{r2}$, two RF chock inductors $L_{f1}$ and $L_{f2}$, two filter capacitors $C_{f1}$ and $C_{f2}$, and one switch $Q_s$ for HF/LF mode selection. The parasitic capacitance of the switches is absorbed into the shunt capacitors $C_{r1}$ and $C_{r2}$. The table in FIG. 11 lists component values of a preferred embodiment of the dual-band reconfigurable rectifier 48.

Figure 10B:
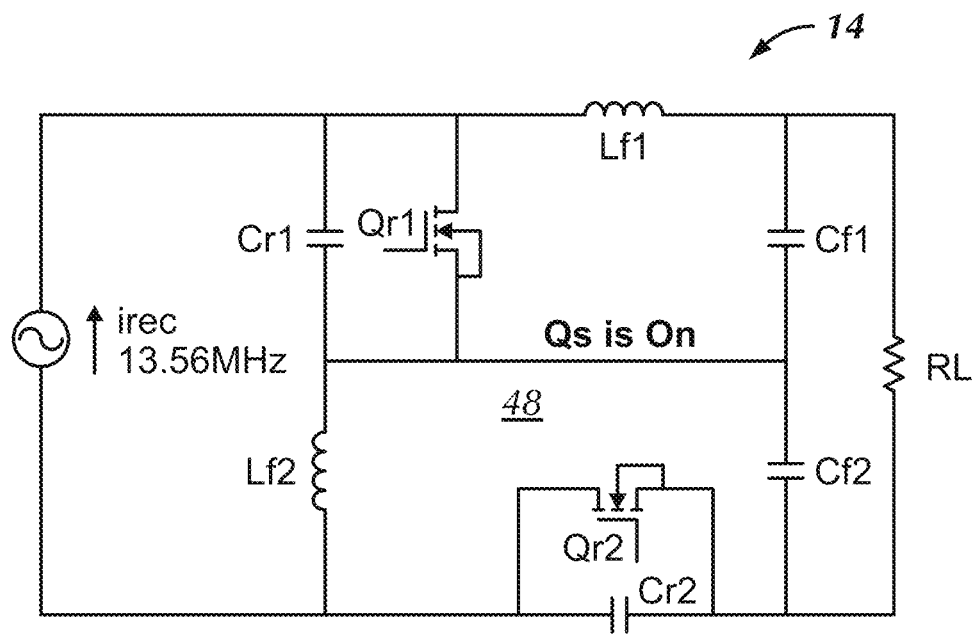
FIG. 10B is the dual band rectifier configuration in high frequency mode according to an embodiment of the present invention.
Figures 10C, 11:
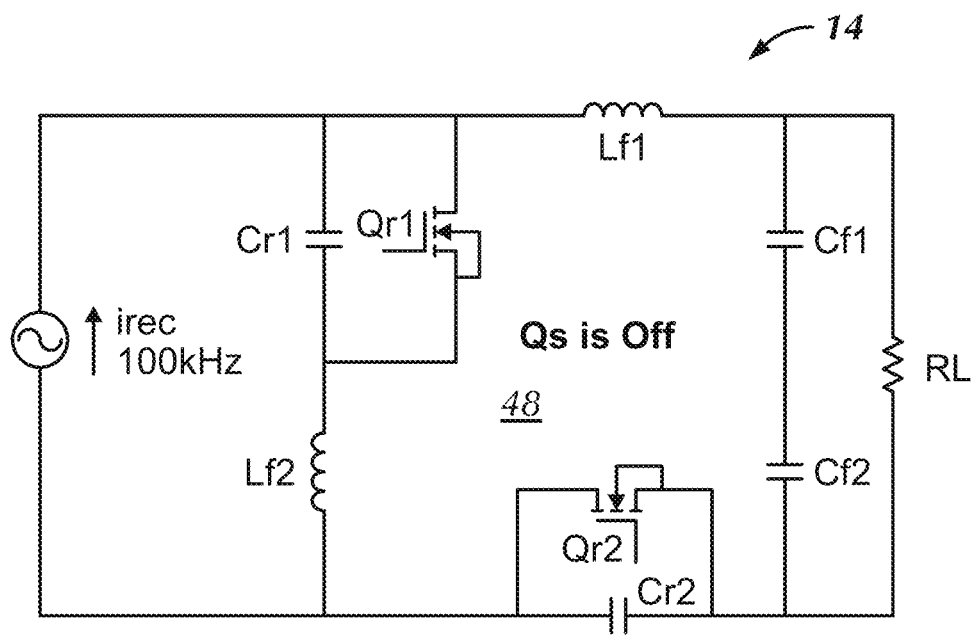
FIG. 10C is the dual band rectifier configuration in low frequency mode according to an embodiment of the present invention.
FIG. 11 is a table of parameters of a dual-band rectifier according to an embodiment of the present invention.

FIGS. 10B and 10C illustrate the operation principles of the proposed rectifier 48 in HF and LF, respectively. As illustrated in FIG. 10B, if $Q_s$ is kept ON, the rectifier 48 functions as two Class-E half-wave rectifiers stacked in series. The rectifier 48 receives power from the high frequency coil 46 (e.g., 13.56 MHz). As illustrated in FIG. 10C, if $Q_s$ is kept OFF, the rectifier 48 functions like a Class-D rectifier and receives power from the low frequency coil 44 (e.g., 100 kHz). The RF chock inductors ($L_{f1}$ and $L_{f2}$) can be considered as short, and the shunt capacitors ($C_{r1}$ and $C_{r2}$) can be considered as open. $Q_s$ can be implemented as a low-speed switch in the controller IC. The frequency gap between 100 kHz and 13.56 MHz is large enough to size the RF chock inductors ($L_{f1}$ and $L_{f2}$), so that they have low impedance at 100 kHz.

Figure 12A:
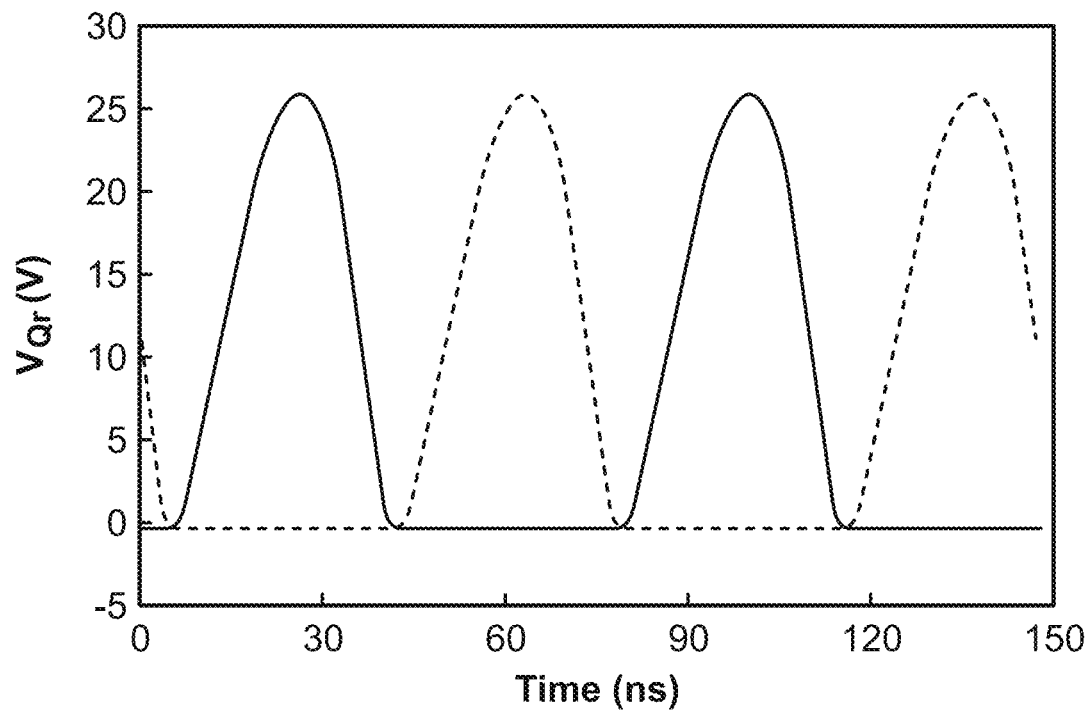
FIG. 12A is a graph of simulated drain to source voltage at 13.56 MHz according to an embodiment of the present invention.
Figure 12B:
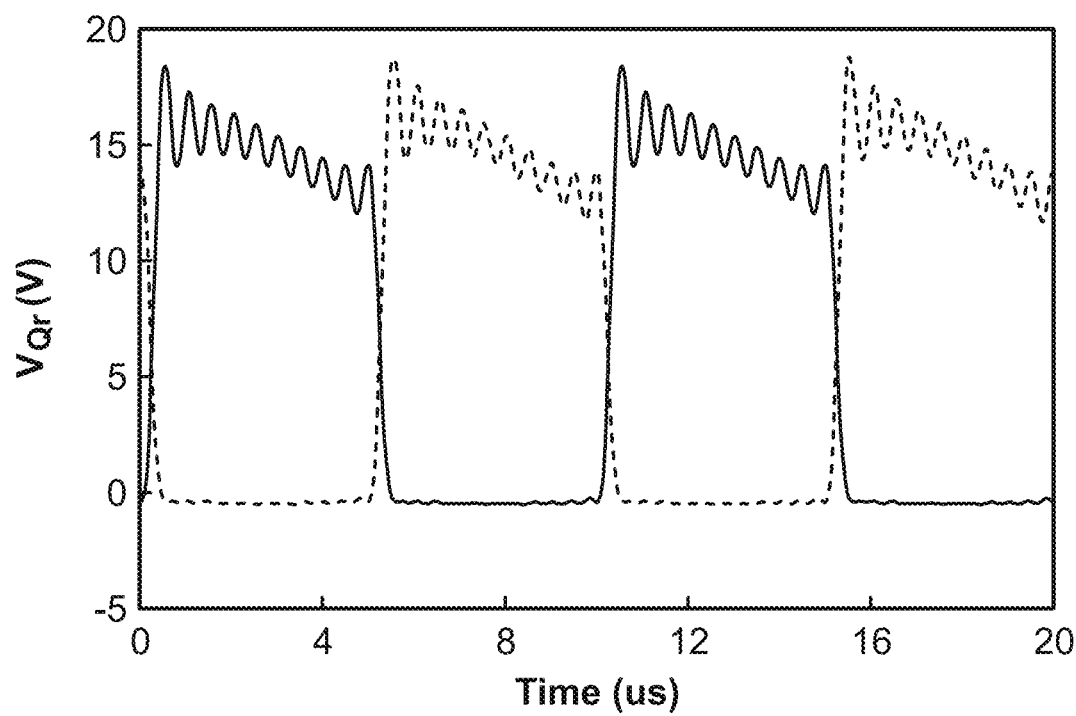
FIG. 12B is a graph of simulated drain to source voltage at 100 kHz according to an embodiment of the present invention.

FIGS. 12A and 12B show the simulated voltage waveforms of $Q_{r1}$ and $Q_{r2}$ working at 13.56 MHz and 100 kHz, respectively. At high frequencies, the rectifier 48 functions as two Class-E rectifiers stacked in series and the waveform of the voltage across the switches is half-wave sinusoidal. At low frequencies, the rectifier 48 functions as one Class-D rectifier and the voltage across the switches is rectangular. In 100 kHz operation, the shunt capacitors $C_{r1}$ and $C_{r2}$ may resonate with the RF chock inductors $L_{f1}$ and $L_{f2}$, resulting in a high frequency ripple at $V_{rec}$. One can reduce the oscillation by using a small $C_r$ at the cost of higher distortion at 13.56 MHz or using a small $L_f$ at the cost of higher ac current across the inductors.

Figure 12C:
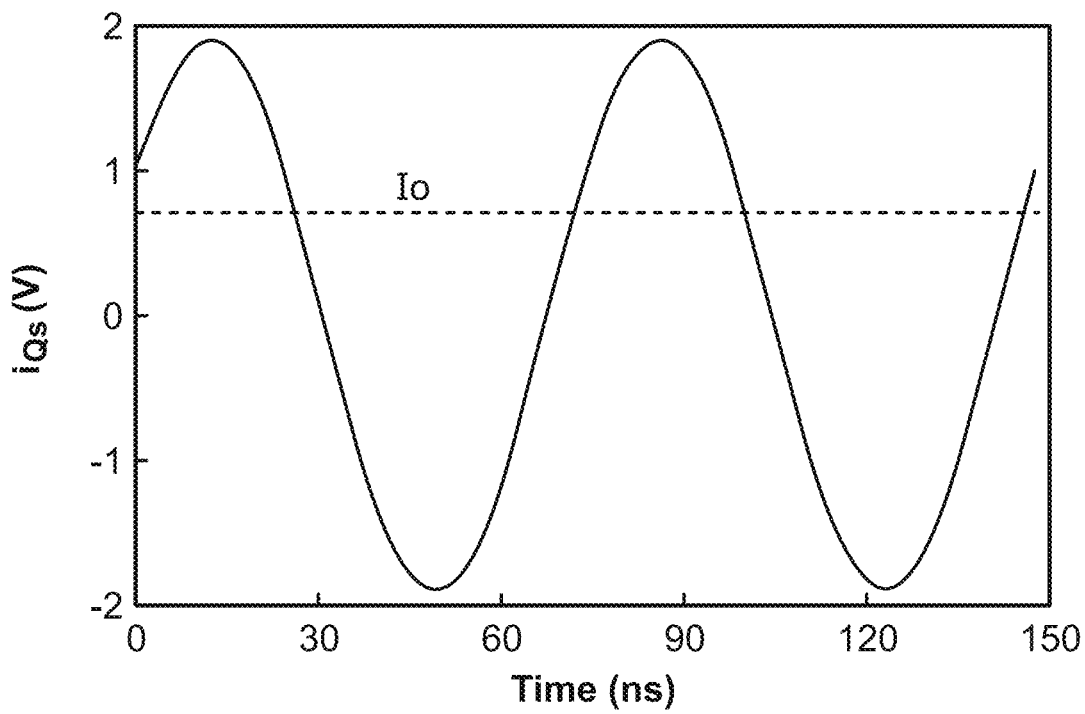
FIG. 12C is a graph of simulated current waveform of mode selection switch at 13.56 MHz according to an embodiment of the present invention.
Figure 12D:
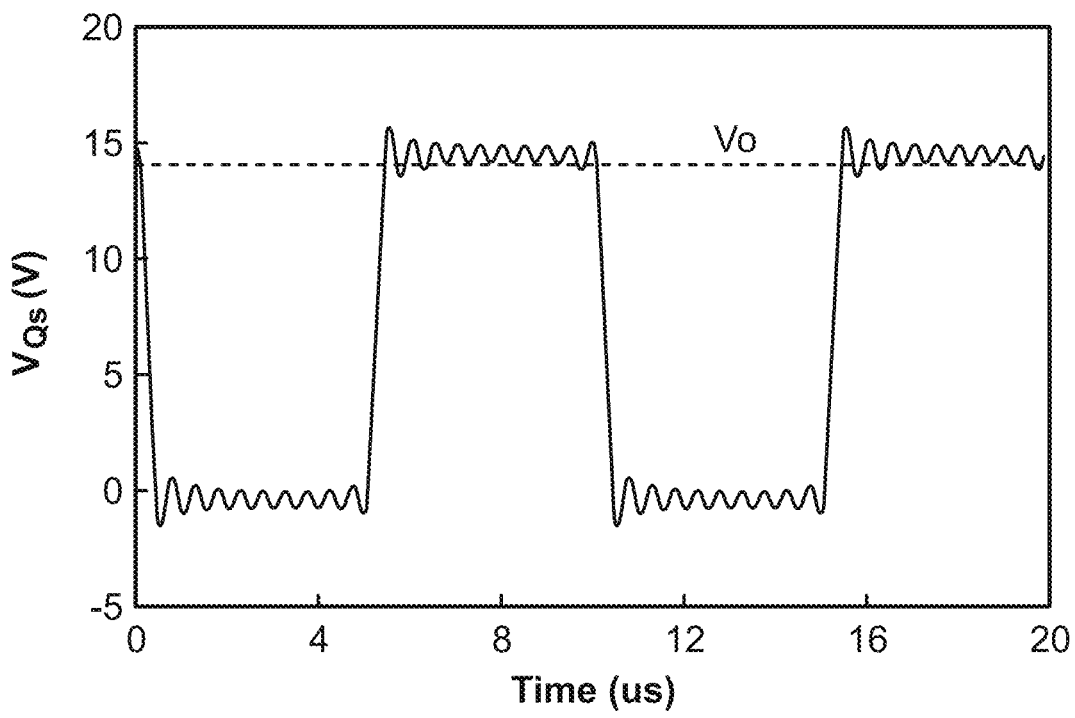
FIG. 12D is a graph of simulated current waveform of mode selection switch at 100 kHz according to an embodiment of the present invention.

FIG. 12C and FIG. 12D show the simulated voltage waveforms of the current and voltage of the mode selection switch $Q_s$ at 13.56 MHz and 100 kHz, respectively. The dashed lines are the dc output current and dc output voltage, respectively. The peak current flow through $Q_{r1}$ and $Q_{r2}$ is twice of the dc output current. The voltage across the mode selected switch $Q_s$ is same as that of the switch $Q_r$, which can be used to choose the current and voltage rating of the switch $Q_s$.

Figure 12E:
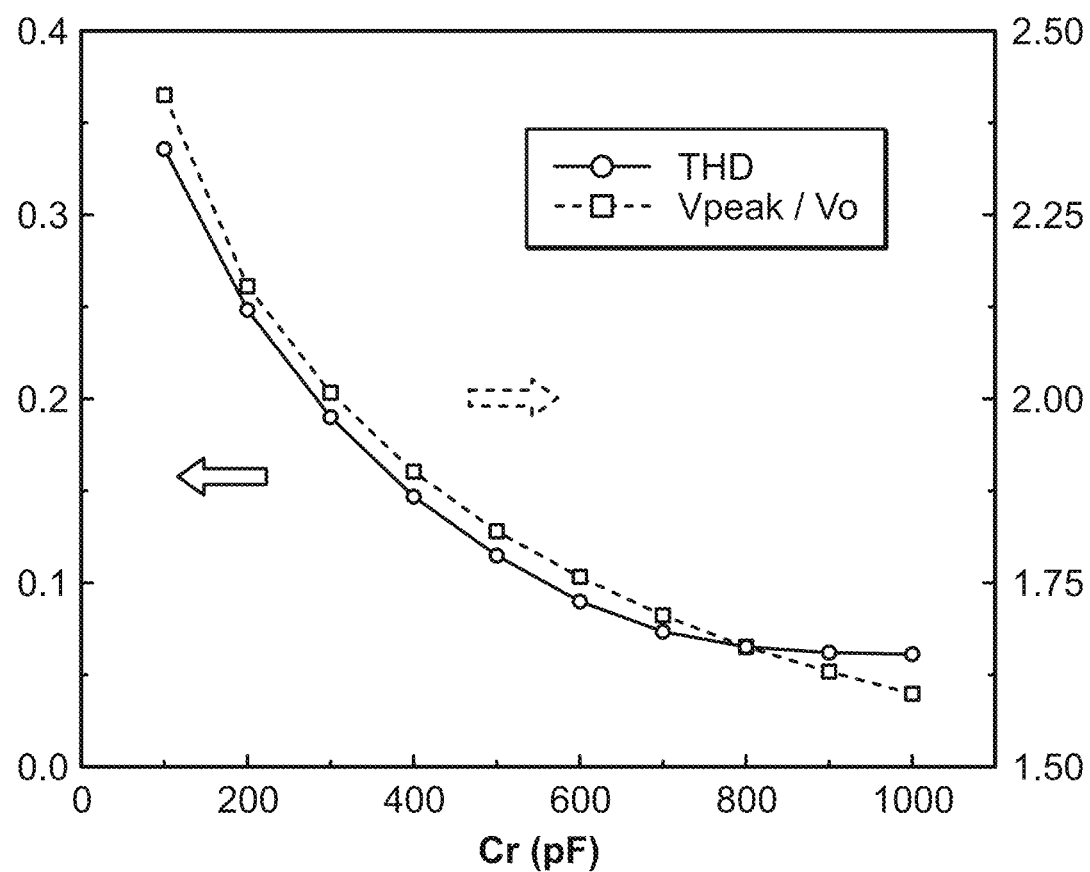
FIG. 12E is a graph of simulation THD and ratio of switch peak voltage to output voltage according to an embodiment of the present invention.
Figure 12F:
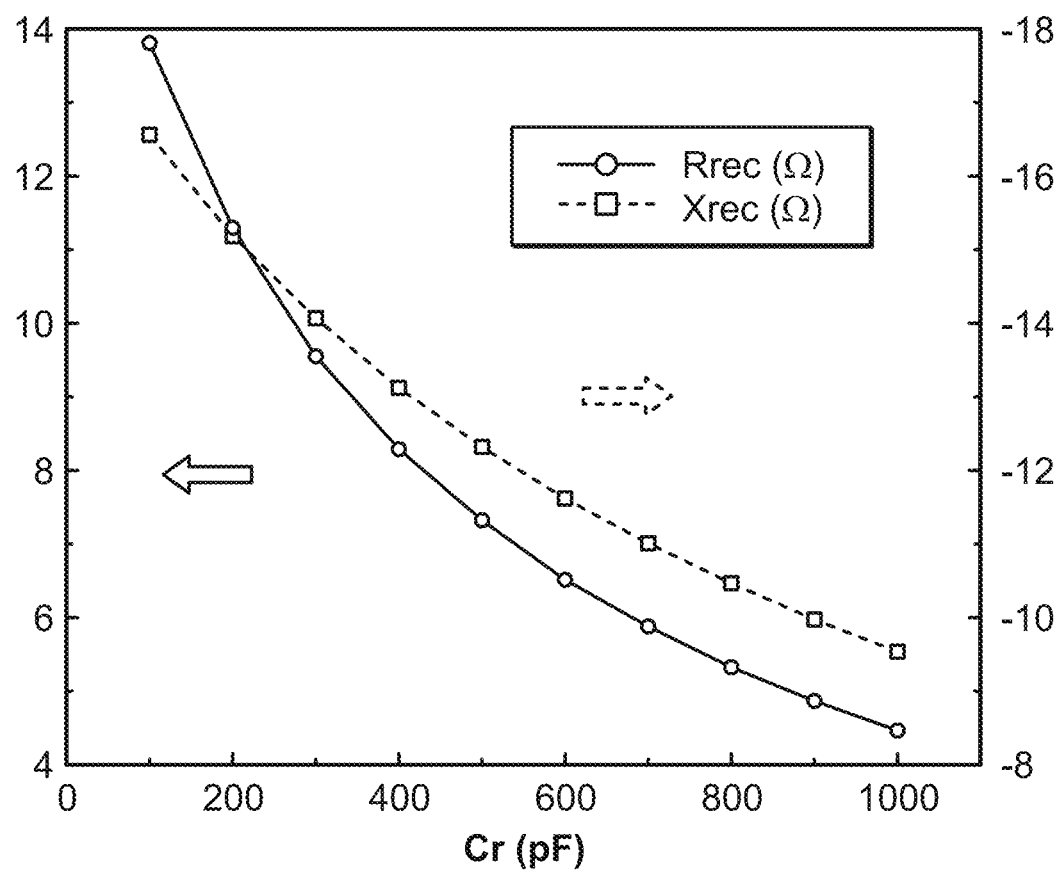
FIG. 12F is a graph of simulated rectifier input impedance according to an embodiment of the present invention.

FIG. 12E and FIG. 12F show the simulated total harmonic distortion (THD) and the ratio of the switch peak voltage to the output voltage (the voltage stress of $Q_{r1}$ and $Q_{r2}$), and the input impedance of the dual-band rectifier 48 with different $C_r$ values. The THD and the switch voltage stress can be reduced by increasing the $C_r$. However, a larger $C_r$ will reduce the input resistance of the rectifier, which may increase the conduction loss of the receiving coils 44 and 46, the RF chock inductors $L_{f1}$ and $L_{f2}$, and the rectifier switches $Q_{r1}$, $Q_{r2}$, and $Q_s$.

As such, the design principles of the dual-band rectifier are:

The shunt capacitors $C_{r1}$ and $C_{r2}$ should be designed depending on the THD requirement, voltage stress, and the ac self-resistance of the receiving coil.

The frequency selection switch $Q_s$ should be implemented as a low-speed switch with low on-resistance. Its voltage rating is the same as the two high speed switches $Q_{r1}$ and $Q_{r2}$.

The inductors $L_{f1}$ and $L_{f2}$ should be designed so that they function as RF chock inductors at high frequencies and function as shorts at low frequencies.

The output filter capacitors $C_{f1}$ and $C_{f2}$ should be big enough to eliminate the output voltage ripple.

Figure 13A:
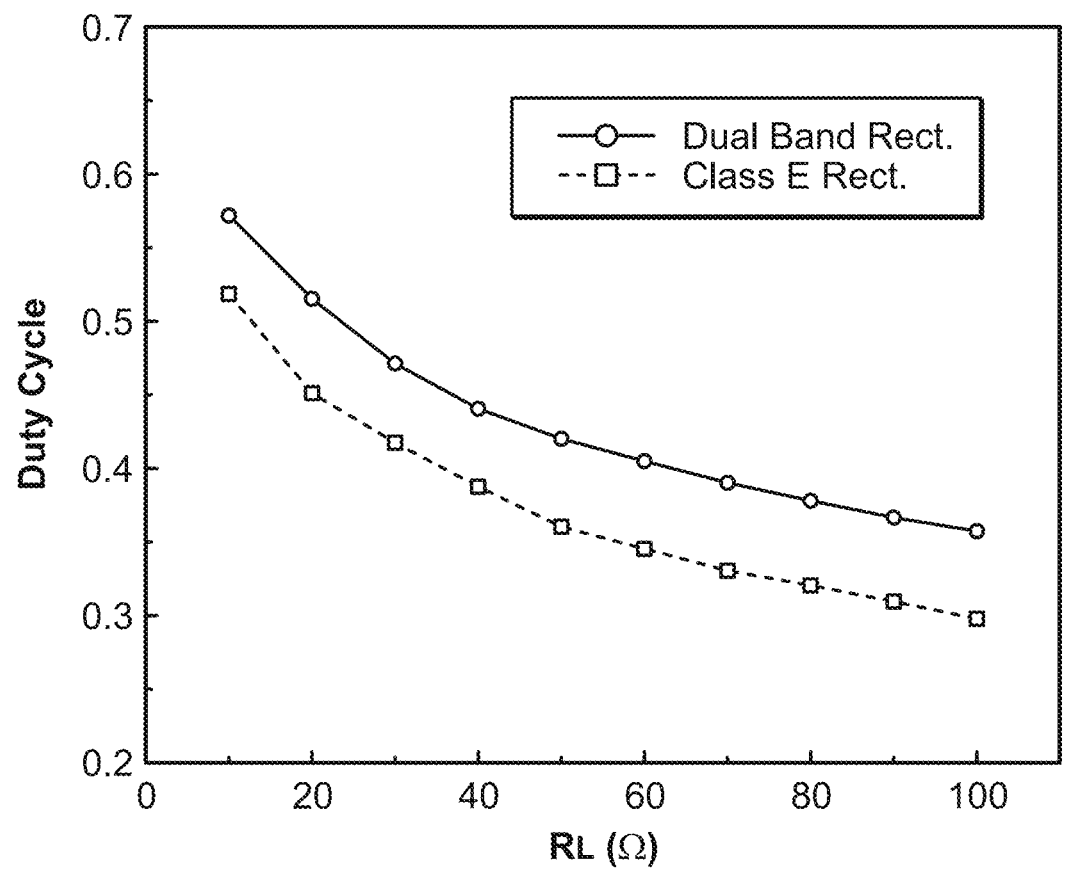
FIG. 13A is a graph of simulated optimal rectifier duty cycle at 13.56 MHz according to an embodiment of the present invention.
Figure 13B:
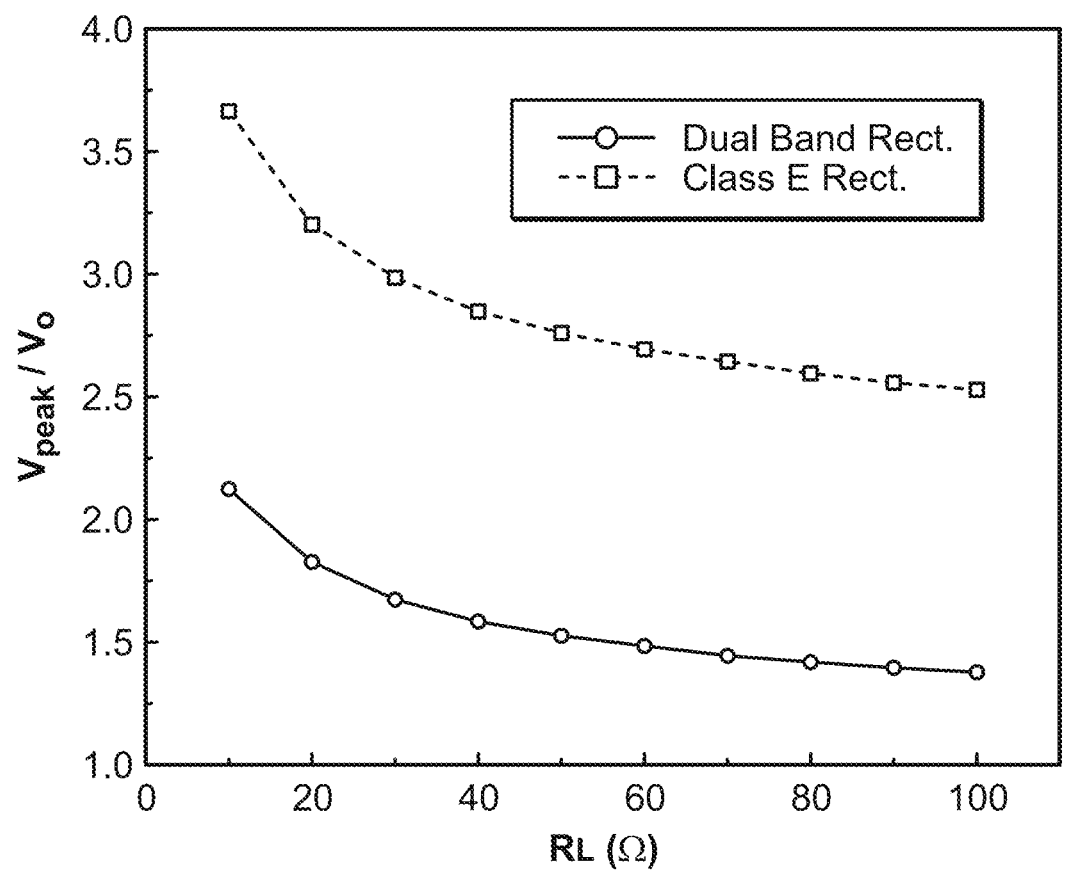
FIG. 13B is a graph of simulated switch voltage stress at 13.56 MHz according to an embodiment of the present invention.
Figure 13C:
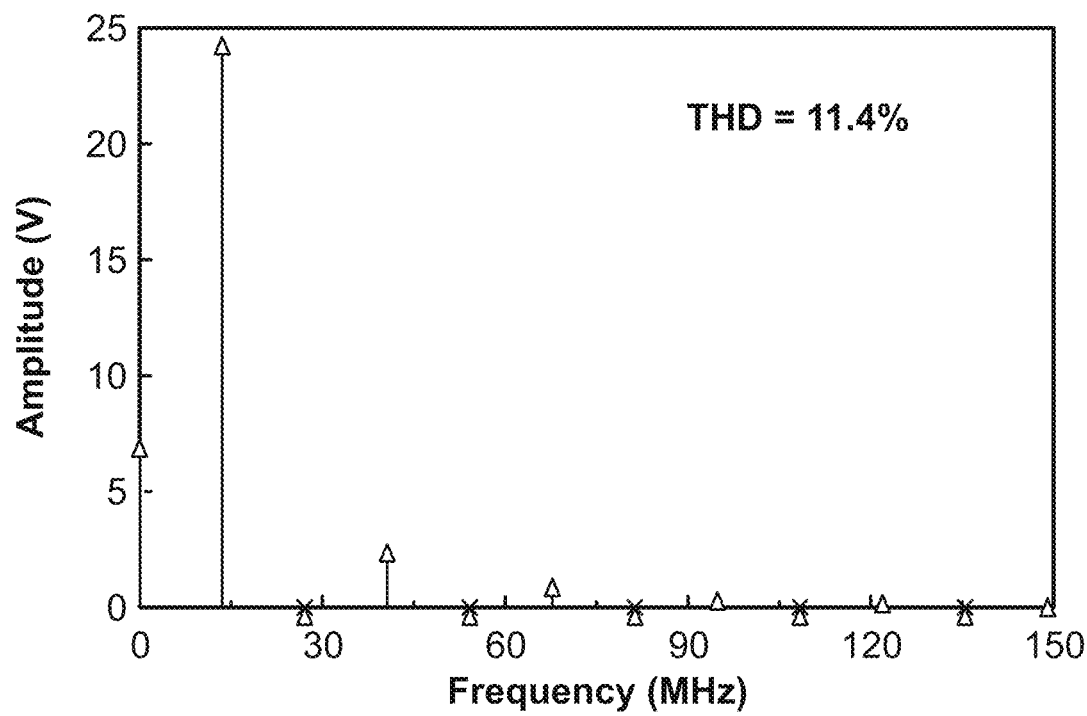
FIG. 13C is a graph of simulated THD of a dual band rectifier at 13.56 MHz according to an embodiment of the present invention.
Figure 13D:
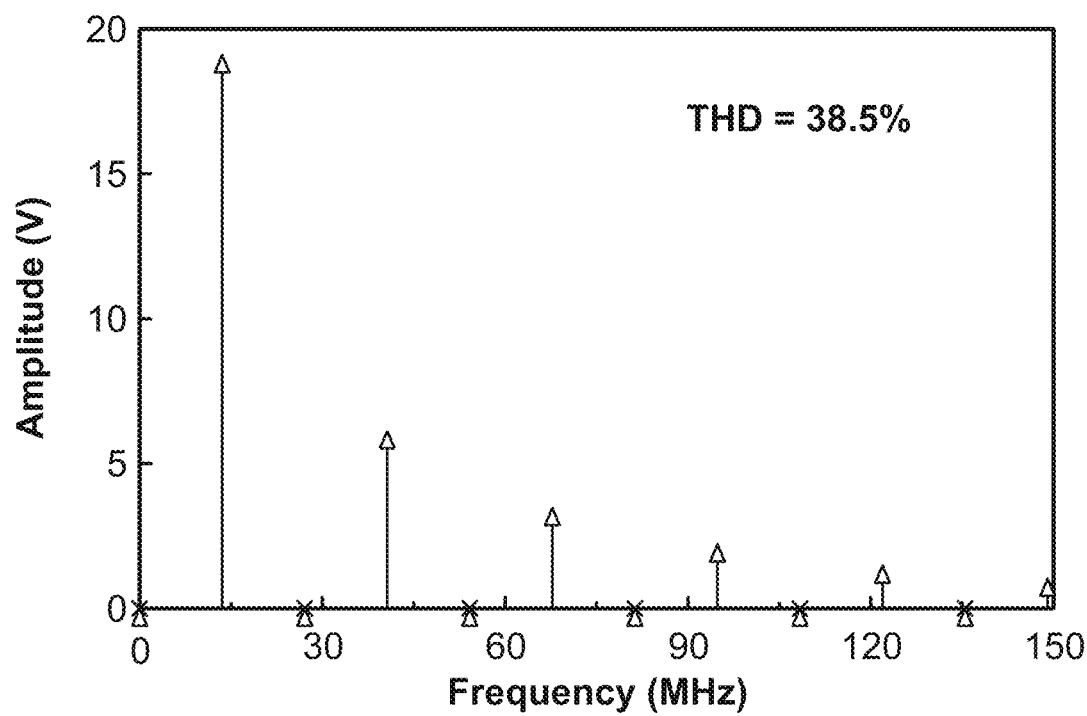
FIG. 13D is a graph of simulated THD of a full bridge rectifier at 13.56 MHz according to an embodiment of the present invention.

At high frequencies (e.g., 13.56 MHz), the optimal duty ratio of the switches in the dual-band rectifier depends on the load impedance. FIGS. 13A and 13B show the optimal duty ratio and voltage stress of the switches for a range of $R_L$. The optimal duty ratio decreases as $R_L$ increases. Since the dual-band rectifier 48 functions as two series-stacked Class-E half-wave current-driven rectifiers, the voltage stress of each high frequency switch is only one half of the voltage stress of a conventional Class-E current-driven rectifier. For low frequency operation, the voltage stress of the two switches is identical to that of a half bridge rectifier. FIGS. 13C and 13D show the simulated total harmonics distortion (THD) of the dual-band rectifier and the full bridge rectifier operating at 13.56 MHz. As expected, the dual-band reconfigurable rectifier works as two series-connected Class-E rectifiers and offers significantly lower THD than a full bridge rectifier.

Compared to a system with two separate rectifiers each designed for one frequency, the proposed dual-band rectifier offers the following advantages:

Higher efficiency, lower voltage stress, and lower harmonic distortion than a full bridge rectifier.

High efficiency and $Q_i$ compatibility (at 100 kHz, the system receives power from a low frequency coil through a full-bridge rectifier).

Very low component count (the dual-band system only has one more low speed switch $Q_s$ than a traditional push-pull Class-E rectifier).

Simple sensing, control, and gate drive circuitry. The HF and LF sensing and control circuitry, as well as the mode-selection switch can be integrated in a single chip.

In summary, the proposed dual-band rectifier can be utilized where high performance and low component count are needed. The key principles of this rectifier are to merge high efficiency low frequency rectifiers (e.g., Class-D) with low distortion high frequency rectifiers (e.g., Class-E), without increasing the component count and the device stress. When designing this rectifier, the LF rectifier and HF rectifier should be jointly optimized so that they share the same loss budget when delivering the same amount of power with the same thermal limit.

Figure 14:
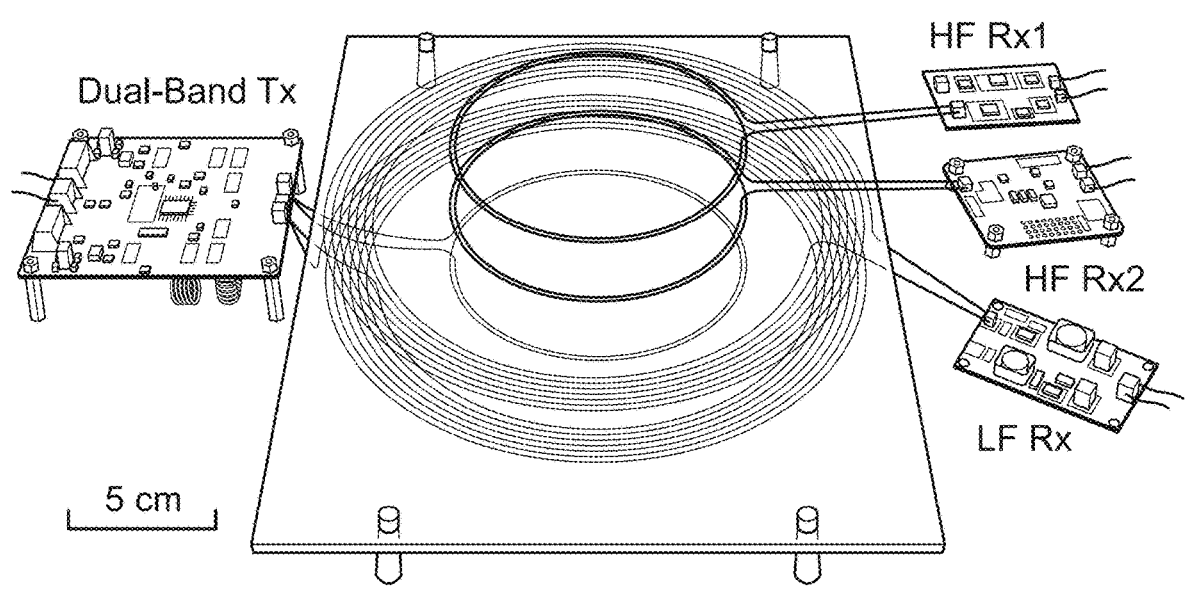
FIG. 14 is a prototype DBMR WPT system according to an embodiment of the present invention.
Figure 15:
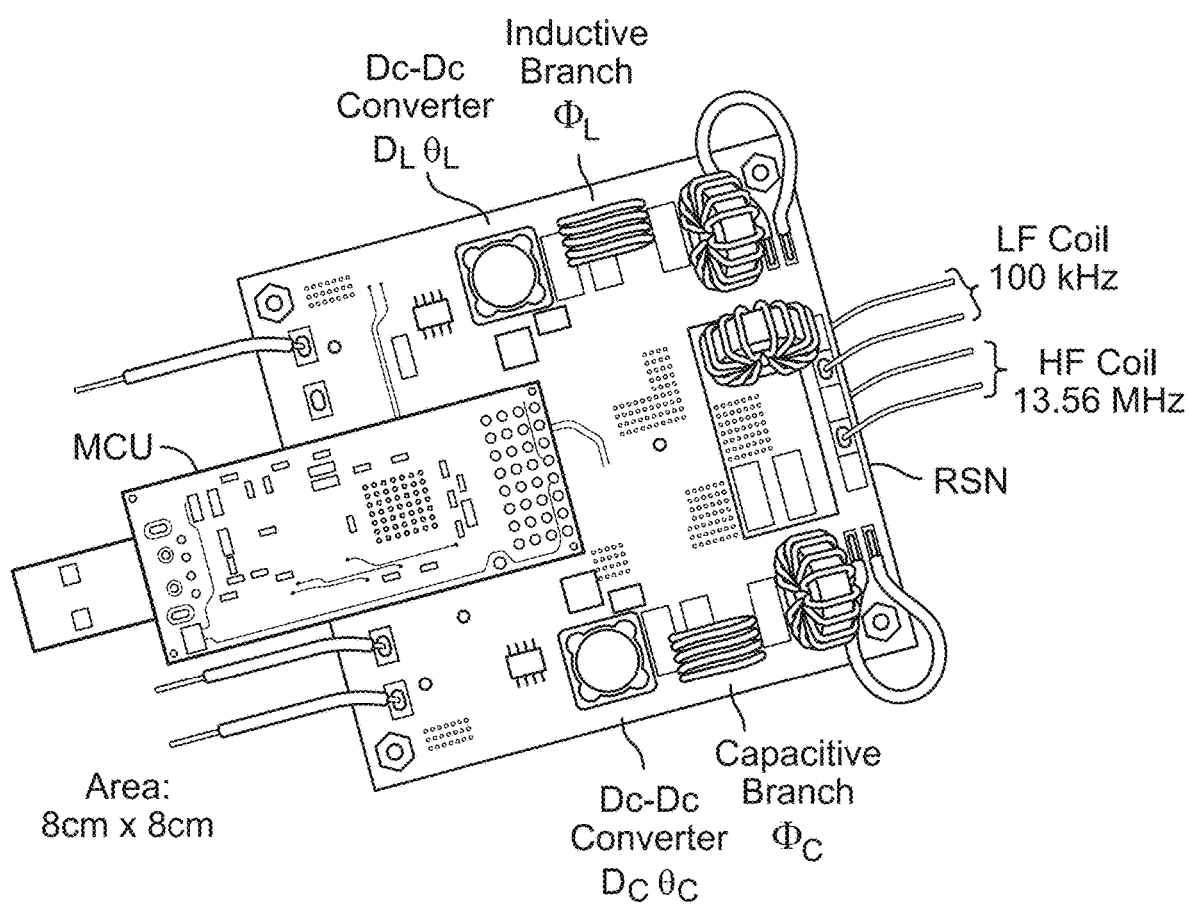
FIG. 15 is a prototype dual band transmitter according to an embodiment of the present invention.
Figure 16:
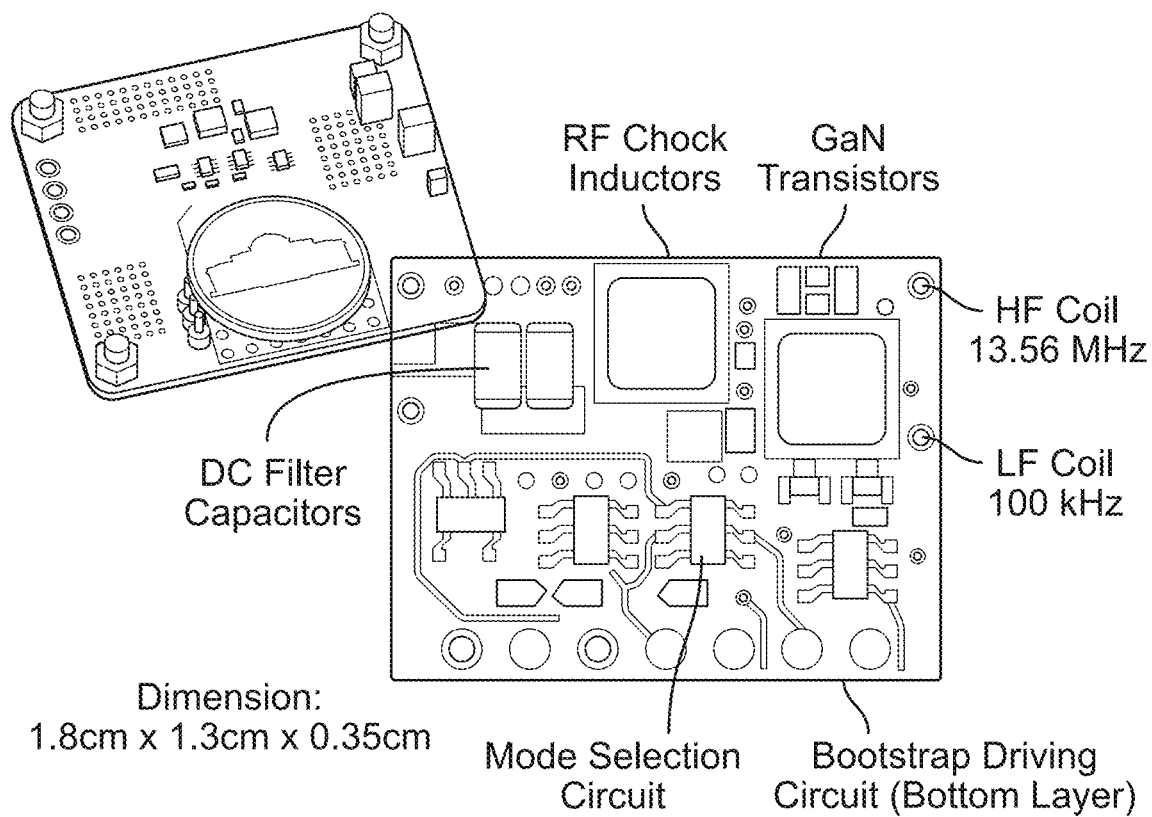
FIG. 16 is a prototype active dual band rectifier according to an embodiment of the present invention.

FIG. 14 shows a prototype dual-band WPT system including a 100 kHz transmitter, a 13.56 MHz transmitter, a 100 kHz receiver, and two 13.56 MHz receivers (one passive and one active). Measured parameters of the prototype are listed in the table in FIG. 18. FIG. 15 shows the prototype dual-band transmitter. Key parameters of the dual-band transmitter are listed in the table in FIG. 19. $L_{f,C}$ and $L_{f,L}$ are configured to resonant with $C_{S,C}$ and $C_{S,L}$. The resonant frequency of the output tank of the two Class-E inverters, $L_{0,C}$ and $C_{0,C}$, $L_{0,L}$ and $C_{0,L}$, are 13.56 MHz. The two HF switches are implemented as GaN transistors (GS66504B). The output capacitance of the two HF switches are absorbed into $C_{S,C}$ and $C_{S,L}$. FIG. 16 shows the prototype dual-band reconfigurable rectifier.

Figure 17A:
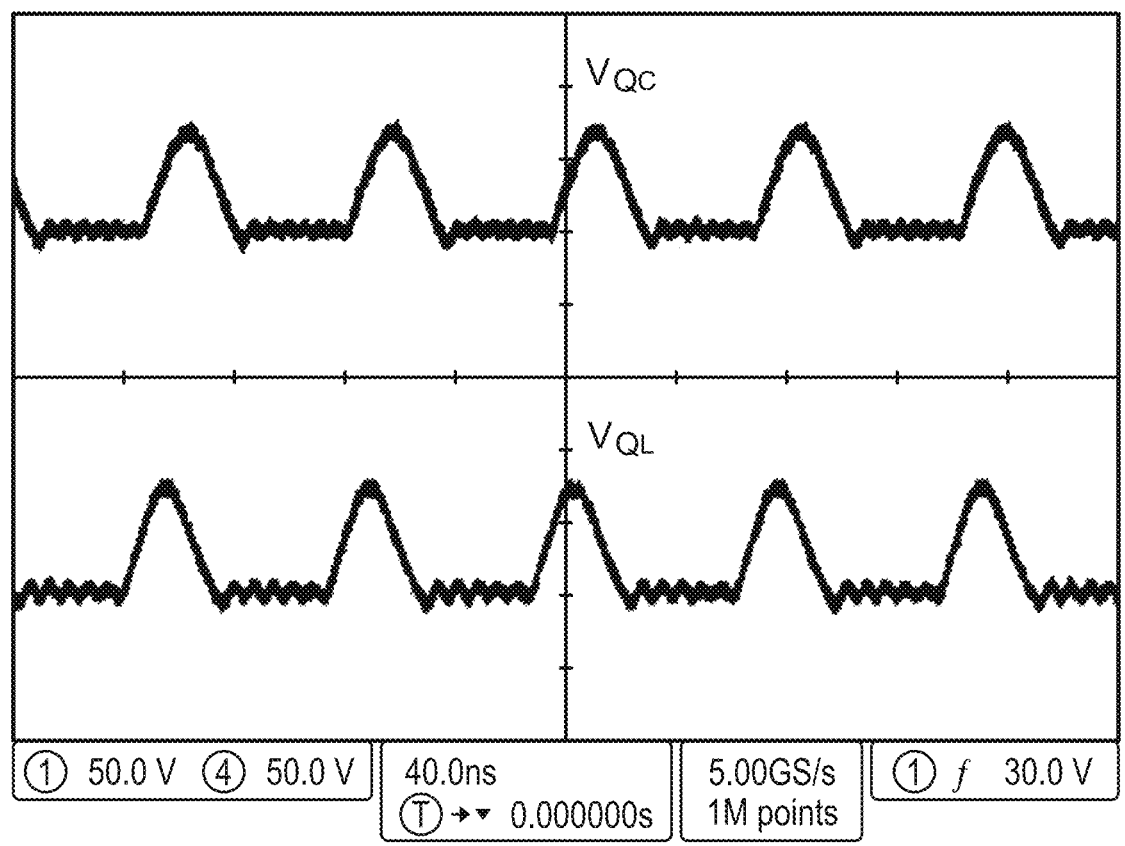
FIG. 17A is a graph of measured drain to source voltage of two HF switches according to an embodiment of the present invention.
Figure 17B:
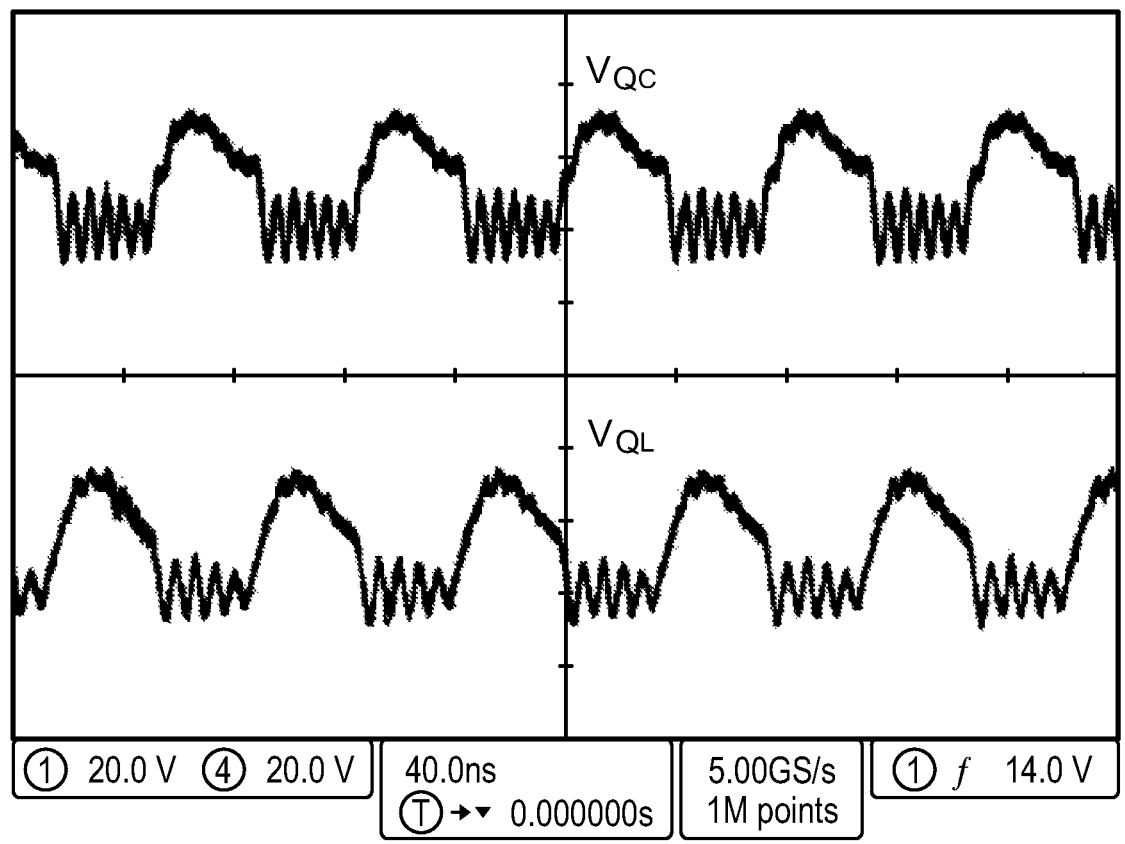
FIG. 17B is a graph of measured drain to source voltage of two HF switches according to an embodiment of the present invention.
Figure 20:
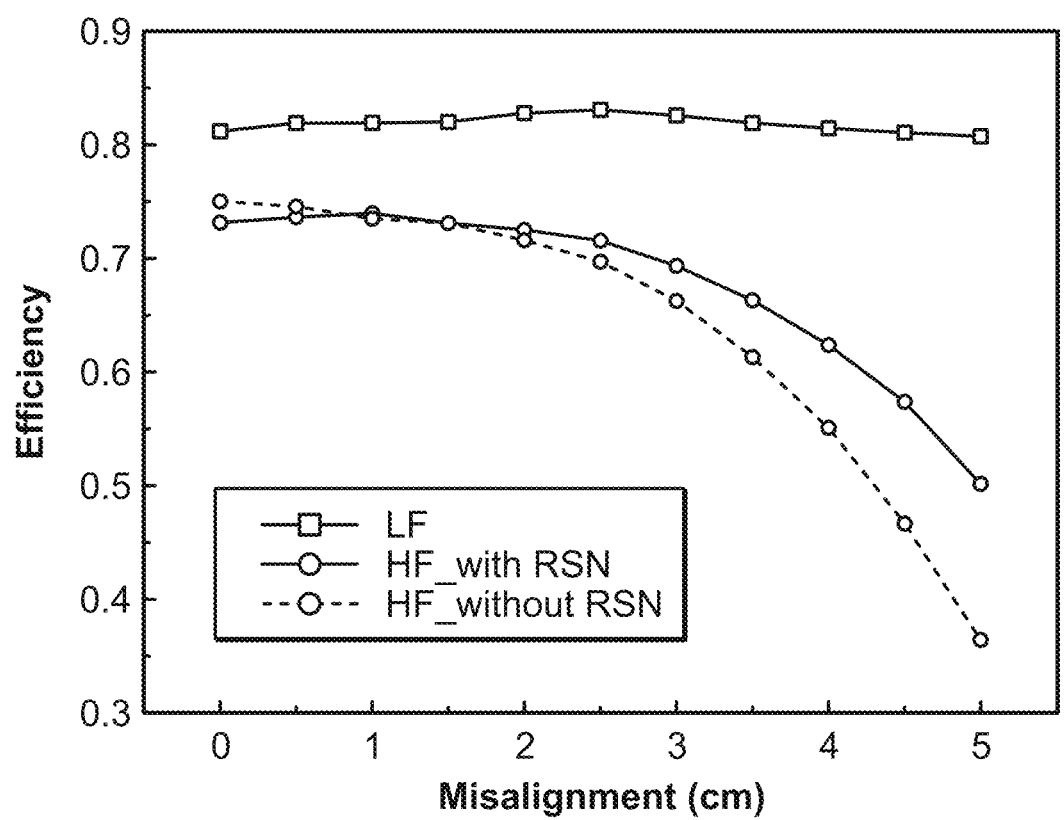
FIG. 20 is a graph of measured end to end efficiency of a dual band WPT system according to an embodiment of the present invention.

A 100 kHz receiver and a 13.56 MHz receiver are designed and tested to evaluate the performance of the dual-band WPT system. The dual-band reconfigurable rectifier is used as the 100 kHz receiver when $Q_s$ is on and as the 13.56 MHz receiver when $Q_s$ is off, respectively. The diameters of the HF coil and the LF coil are 10 cm and 20 cm, respectively. The distance between the transmitting coil and the receiving coil is 2.8 cm. The maximum horizontal misalignment is 5 cm. FIGS. 17A and 17B show the ZVS operation of the HF switches with $Z_{tx}$ (=14−j26Ω). The system delivers 10 W with and without RSN at 13.56 MHz. The RSN enables ZVS of both switches with appropriate phase and amplitude modulation. FIG. 20 shows the measured end-to-end efficiency of the 100 kHz WPT system the 13.56 MHz WPT system with and without using the RSN. As shown in FIG. 20, the system with the RSN achieves higher efficiency than the system without the RSN across the entire misalignment range. Up to 13% of efficiency improvements are observed with significant load reactance (e.g., with 5 cm misalignment). It was also observed that the presence of LF coil reduces the quality factor of the HF coil, thus reduces the system efficiency with large coil misalignments. The efficiency of the dual-band system can be improved by increasing the Q of the dual-band coils (through better materials and better 2D layout).

Figure 21:
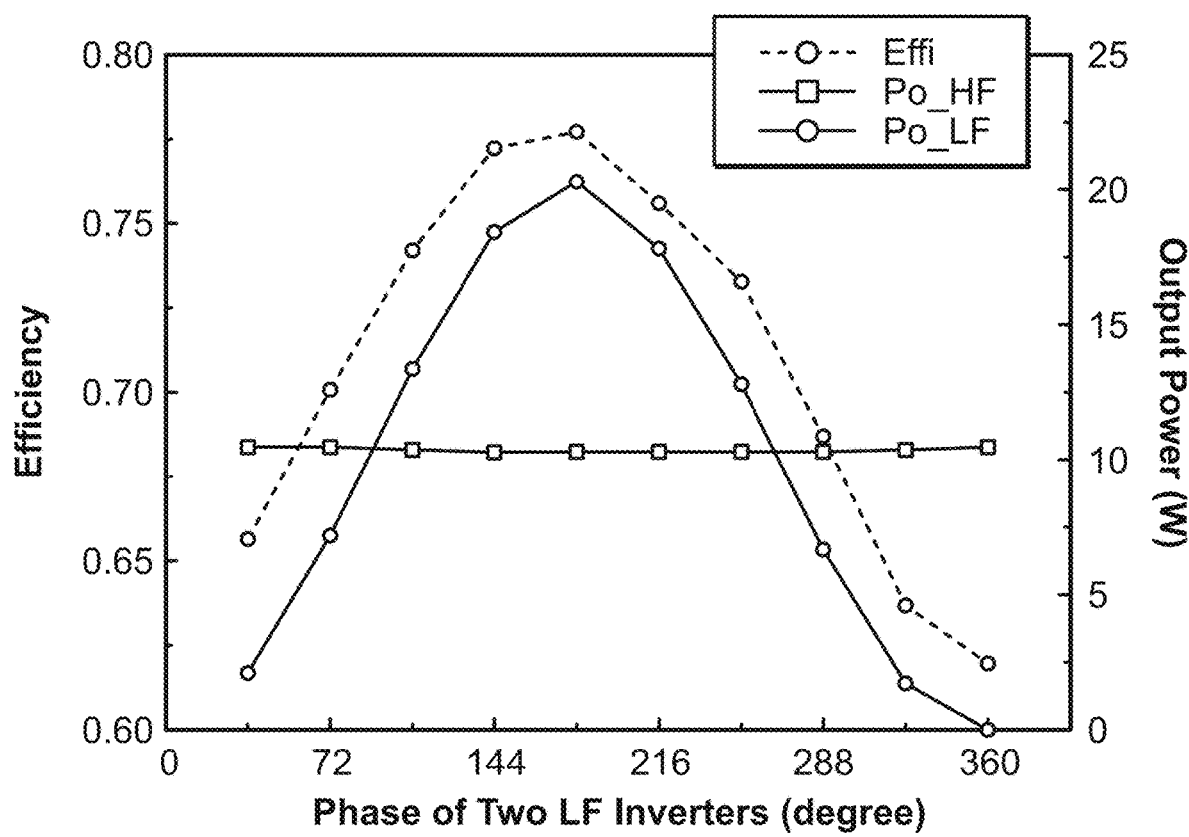
FIG. 21 is a graph of maintaining power delivered at high frequency and modulating power at low frequency according to an embodiment of the present invention.
Figure 22:
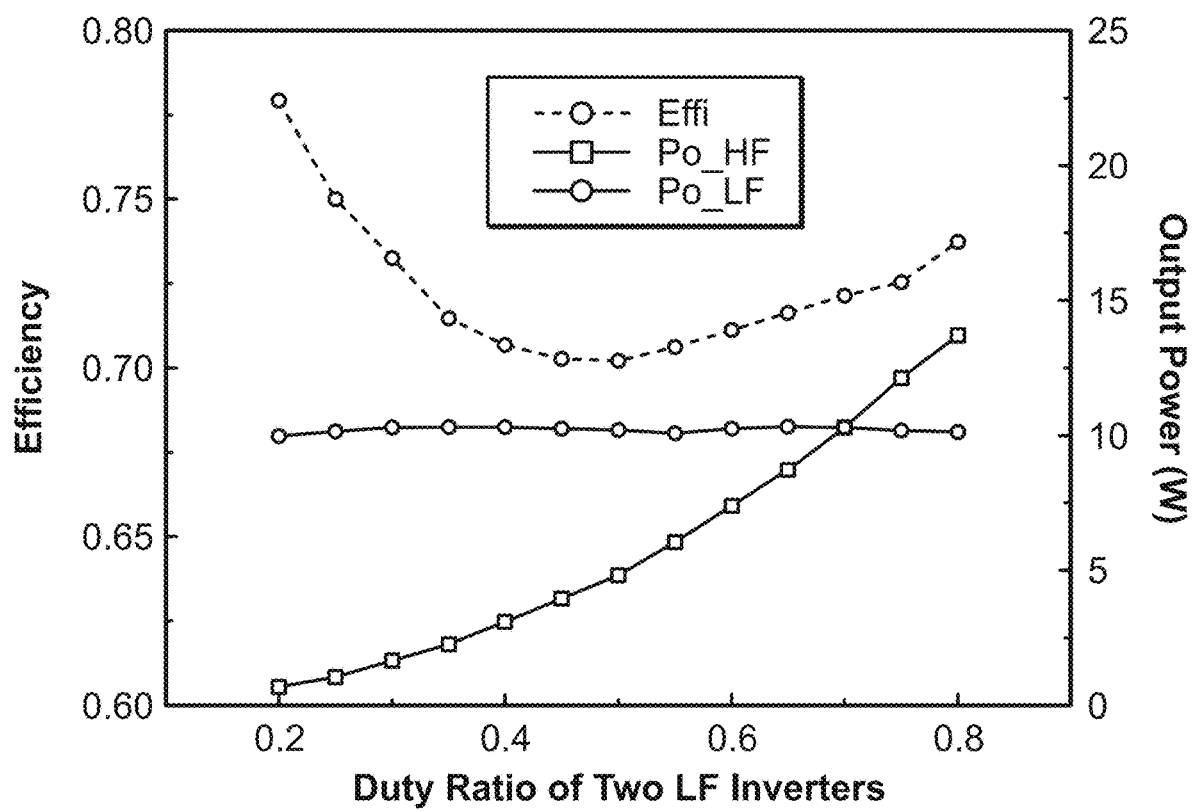
FIG. 22 is a graph of maintaining power delivered at high frequency and modulating power at low frequency according to an embodiment of the present invention.

FIGS. 21 and 22 show the measured efficiency and power of the LF and HF systems working together. The system can independently modulate the power delivered by the LF coil and HF coil. The power delivered by the LF coil is controlled by the duty ratio $D_L$, $D_C$, and the phase shift $\theta_L$ and $\theta_C$. The power delivered by the HF coil is controlled by the intermediate voltage $M_L$, $M_C$, and the phase $\Phi_L$, and $\Phi_C$. The operation of the two frequency bands are independent from each other with negligible cross-coupling effects. As shown in FIG. 21, by keeping $D_L$, $D_C$, $\Phi_L$, and $\Phi_C$ as constants, and modulating the phase difference between $\theta_L$ and $\theta_C$ from 0 to $2\pi$, the power transferred at 100 kHz (Po_LF) can be modulated between 0 W to 20 W, and the power transferred at 13.56 MHz (Po_HF) can be kept constant at 10 W. Similarly, as shown in FIG. 22, one can keep the power transferred at 13.56 MHz constant at 10 W, and modulate the power transferred at 100 kHz from 0 W to 15 W by changing the duty ratio of the LF inverters. The measured efficiencies of the HF and LF transmitters working together are also shown in FIGS. 21 and 22. When delivering 10 W of power at 13.56 MHz, and delivering 20 W of power at 100 kHz, the system reaches a maximum end-to-end efficiency of 77.7%.

Figure 23A:
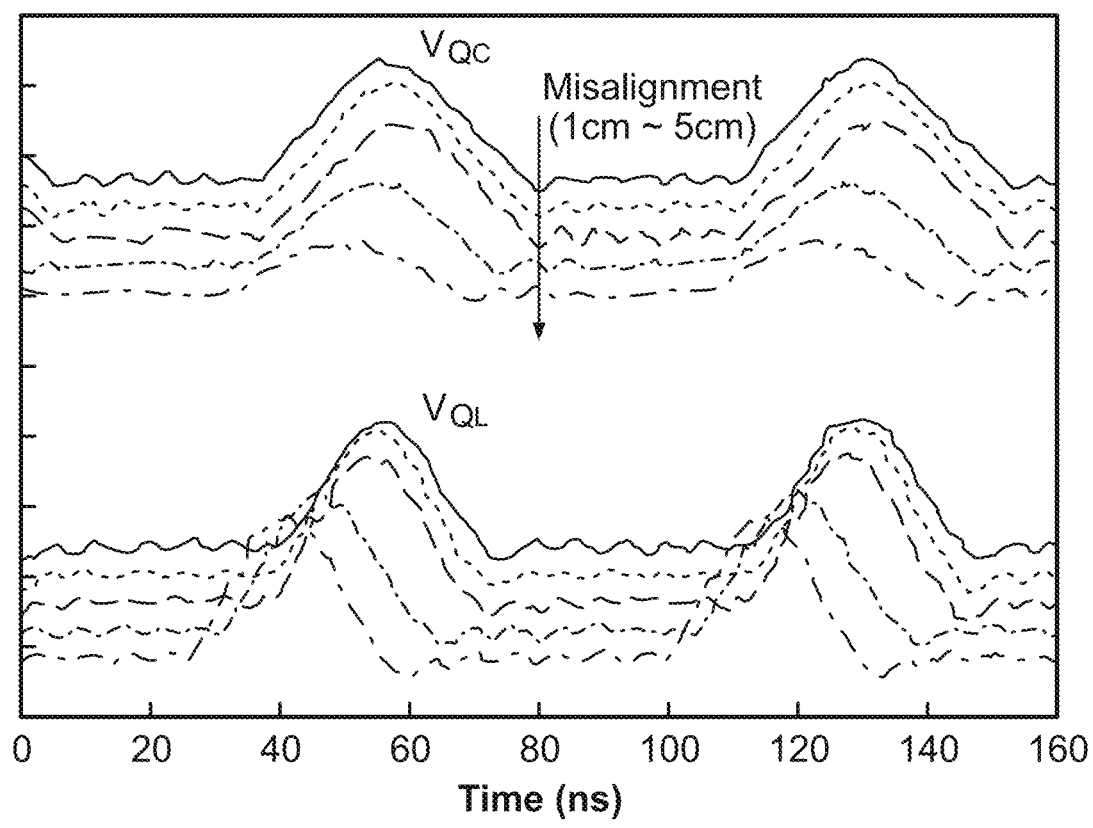
FIG. 23A is a graph of measured drain to source voltage with coil misalignment with phase shift and ZVS according to an embodiment of the present invention.
Figure 23B:
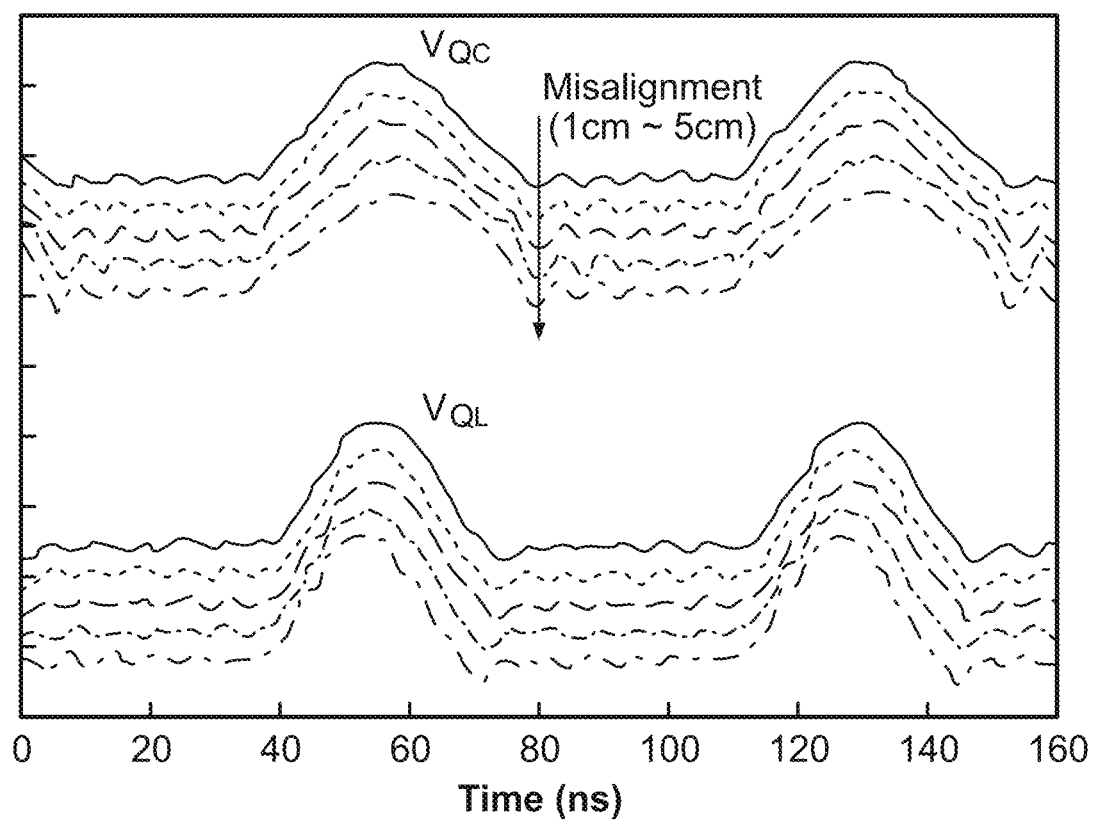
FIG. 23B is a graph of measured drain to source voltage with coil misalignment without phase shift and ZVS according to an embodiment of the present invention.

FIGS. 23A and 23B show the measured drain-to-source voltage waveforms of the Class-E inverters with and without the RSN. The coil misalignment changes from 1 cm to 5 cm. The Class-E inverters operate in ZVS across the entire coil misalignment range with the RSN. $D_L/D_C$ and $\Delta_{LC}$, are automatically selected from a look-up table according to the measured dc power ratio $P_{dc,L}/P_{dc,C}$.

Figure 24A:
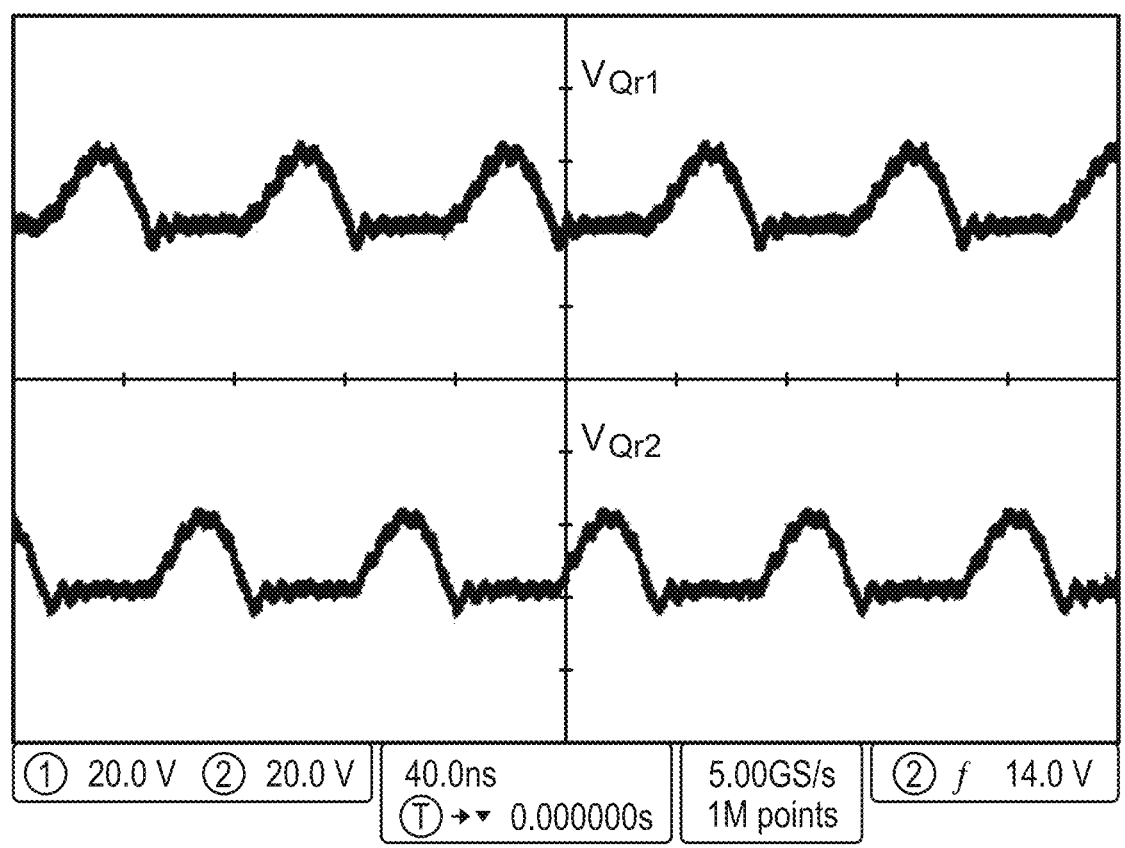
FIG. 24A is a graph of measured waveforms of an active dual band rectifier drain to source voltage at 13.56 MHz according to an embodiment of the present invention.
Figure 24B:
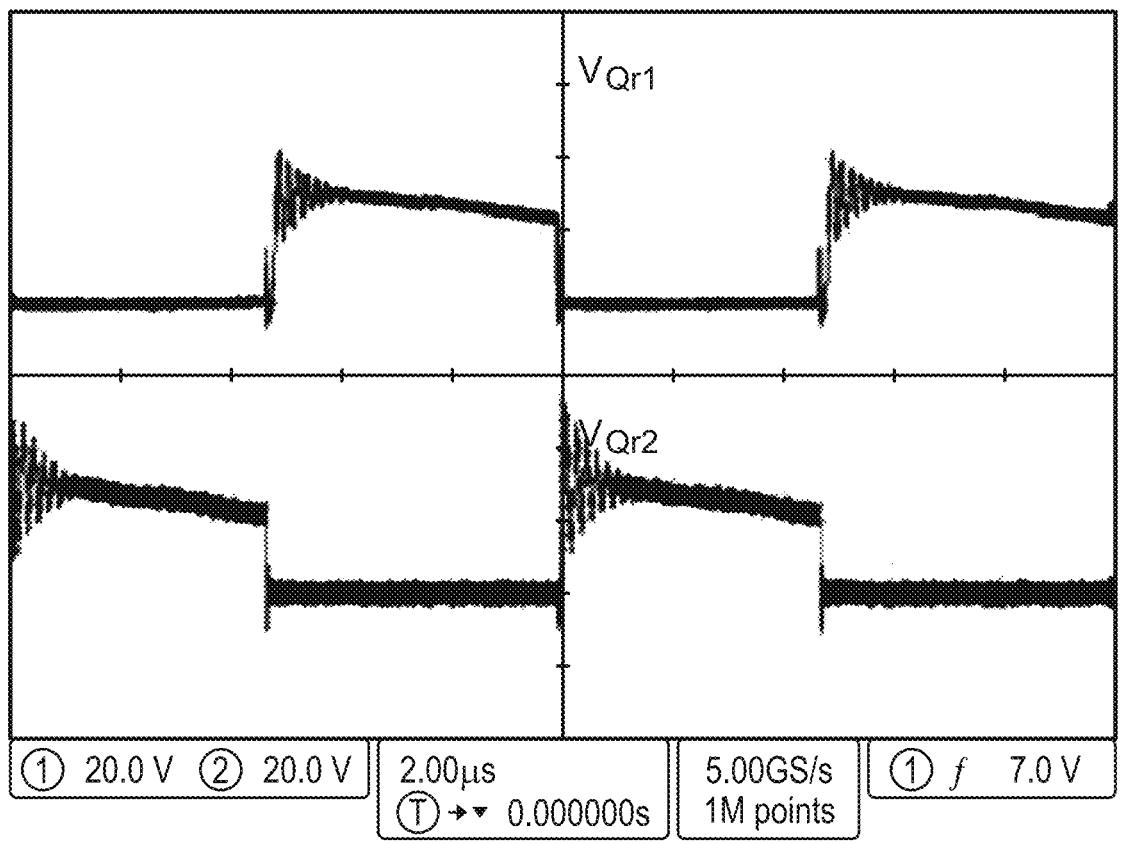
FIG. 24B is a graph of measured waveform of an active dual band rectifier drain to source voltage at 100 kHz according to an embodiment of the present invention.

The rectifiers reported in the previous measurement results were implemented with passive diodes. To further improve the system end-to-end efficiency, a dual-band rectifier implemented with synchronous GaN HEMTs is built and tested. The dimension of the active rectifier is 1.8 cm×1.3 cm. The driving and auxiliary circuitry are all included. The shunt capacitors of the dual-band rectifier $C_{r1}$ and $C_{r2}$ are 500 pF and the ratio $V_{peak}/V_o$ is about 1.82. The maximum dc output voltage of $Q_{r1}$ and $Q_{r2}$ ($V_{Ds}$=40 V) is about 22 V and the maximum output power is 15 W at 13.56 MHz. A low cost and low on-resistance MOSFET ECH8420 is used as the mode selection switch $Q_s$. The RF chock inductors $L_{f1}$ and $L_{f2}$ are chosen as 1.2 pH which behave as high impedance (about 102j Ω) at 13.56 MHz to block the high frequency current (reduce the ac power loss). They behave as short at 100 kHz. FIGS. 24A and 24B show the measured waveforms of the dual-band rectifier when working at HF and LF, respectively. The measured waveforms closely match with simulations.

Figure 25A:
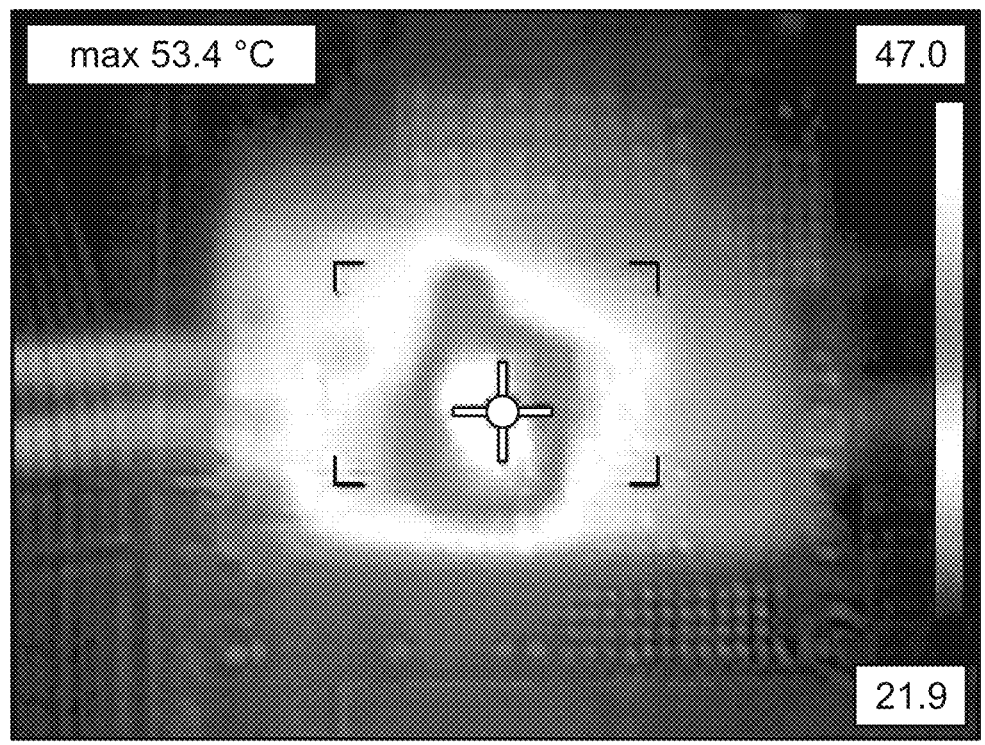
FIG. 25A is a thermal image of an active dual band rectifier with output power of 15 W at 13.56 MHz according to an embodiment of the present invention.
Figure 25B:
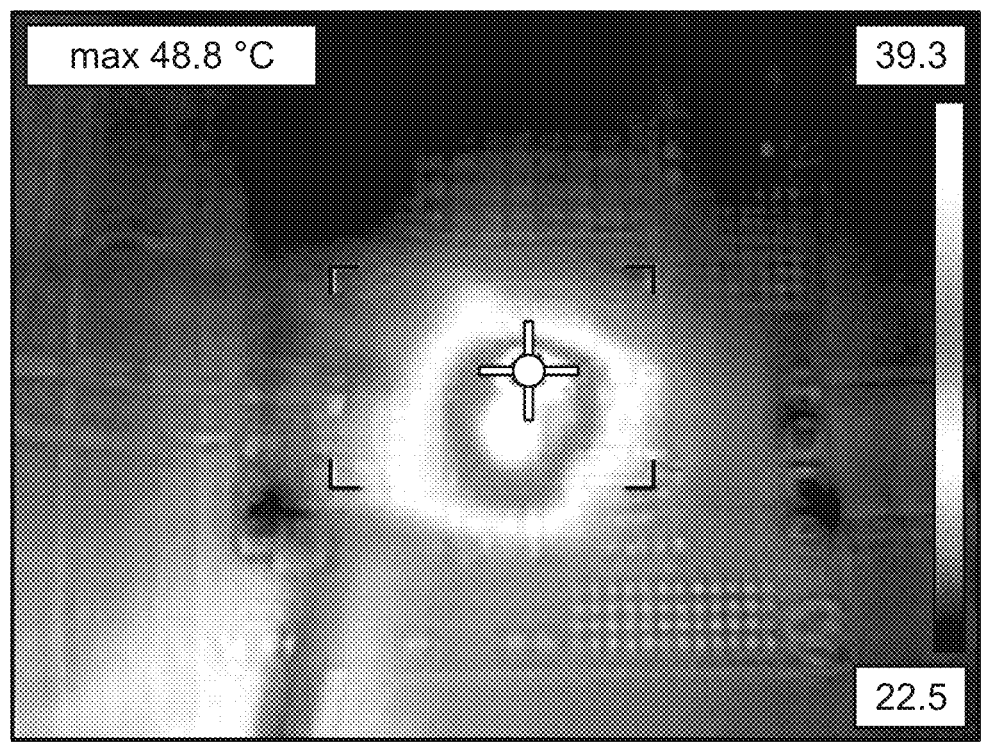
FIG. 25B is a thermal image of an active dual band rectifier with output power of 15 W at 100 kHz according to an embodiment of the present invention.
Figure 26A:
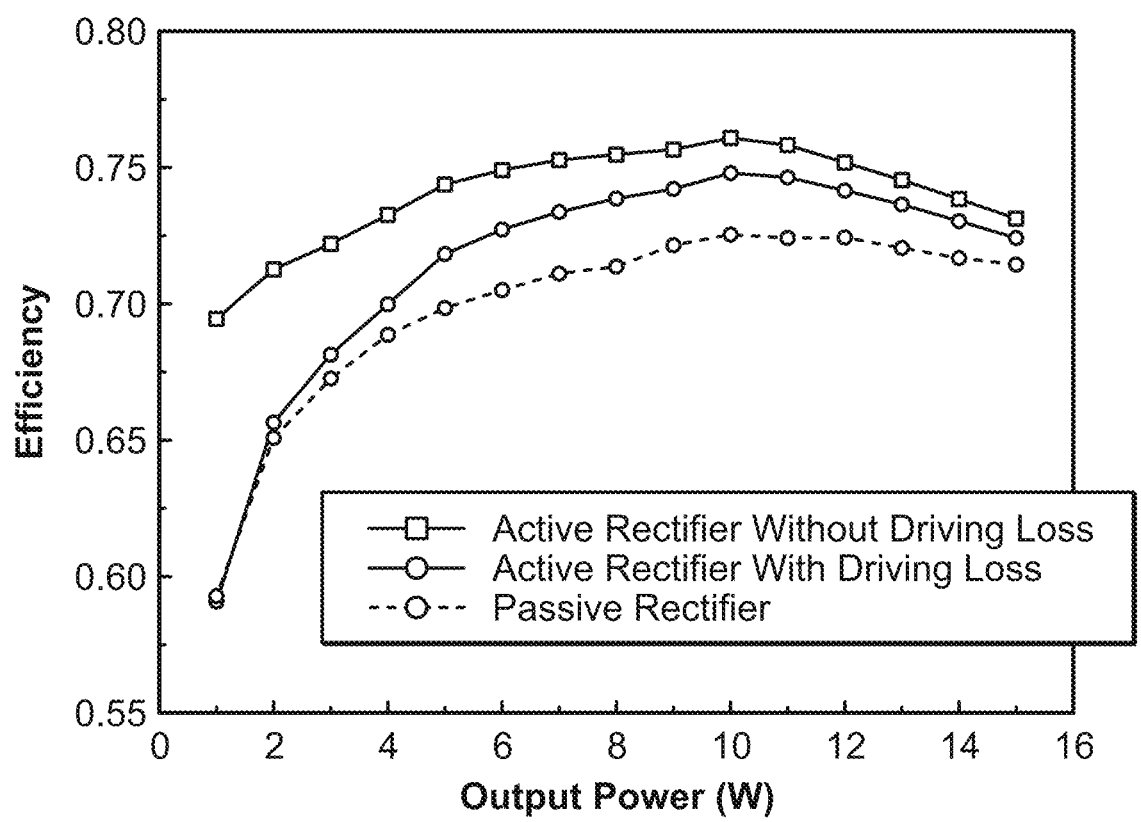
FIG. 26A is a graph of measured efficiency of active and passive rectifiers at 13.56 MHz according to an embodiment of the present invention.
Figure 26B:
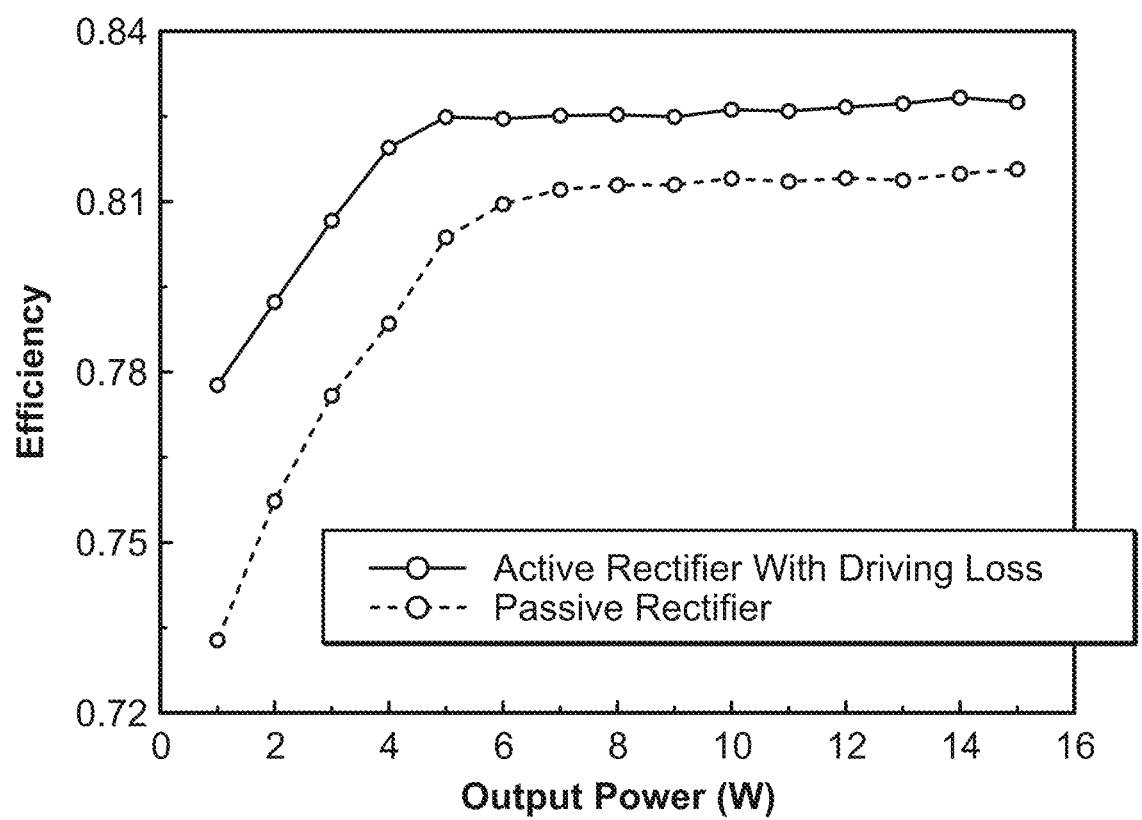
FIG. 26B is a graph of measured efficiency of active and passive rectifiers at 100 kHz according to an embodiment of the present invention.

FIGS. 25A and 25B show the thermal images of the active dual-band rectifier when receiving 15 W. FIG. 26A compares the measured dc-dc efficiency of the WPT system at 13.56 MHz with and without synchronous rectification. FIG. 26B does the same comparison for 100 kHz operation. As expected, synchronous rectification significantly improves the system efficiency across the full power range.

As such, disclosed herein is a dual-band multi-receiver WPT architecture targeting large coil misalignment and significant impedance variation. This architecture is developed based on a novel reactance steering network (RSN) that can precisely compensate an arbitrary load reactance by dynamically steering the power between two inverter branches. The theory of RSN is developed and a design method is presented that can cover a wide reactance variation range. Also disclosed is a topology and operation principles of a dual-band reconfigurable rectifier that can achieve high performance at both 100 kHz and 13.56 MHz. The effectiveness of the proposed architecture is verified by a 30 W dual-band WPT prototype that can efficiently and independently power multiple 100 kHz and 13.56 MHz receivers with significant coil misalignment and load variation.

It is understood that the above-described embodiments are only illustrative of the application of the principles of the present invention. The present invention may be embodied in other specific forms without departing from its spirit or essential characteristics. All changes that come within the meaning and range of equivalency of the claims are to be embraced within their scope. Thus, while the present invention has been fully described above with particularity and detail in connection with what is presently deemed to be the most practical and preferred embodiment of the invention, it will be apparent to those of ordinary skill in the art that numerous modifications may be made without departing from the principles and concepts of the invention as set forth in the claims.

What is claimed is:

1. A transmitter for a dual-band multi-receiver (DBMR) wireless power transfer (WPT) system, comprising:
   a first branch comprising a first dc-dc converter coupled to a first inverter;
   a second branch comprising a second dc-dc converter coupled to a second inverter;
   a reactance steering network (RSN) coupled to the first and second inverters, the RSN comprising an inductive branch and a capacitive branch, wherein power is steered toward the inductive branch when load impedance is capacitive and power is steered toward the capacitive branch when load impedance is inductive;
   a high frequency coil coupled to the RSN, the first and second inverters configured to drive the high frequency coil; and
   a low frequency coil coupled to the first and second dc-dc converters, the first and second dc-dc converters configured to drive the low frequency coil.

2. The transmitter of claim 1, wherein the first and second dc-dc converters are configured to operate between about 90-200 kHz.

3. The transmitter of claim 1, wherein the first and second inverters are configured to operate between about 6.78-27.12 MHz.

4. The transmitter of claim 1, wherein the first and second dc-dc converters modulate inputs of the first and second inverters while simultaneously driving the low frequency coil.

5. The transmitter of claim 1, wherein the first and second dc-dc converters drive the low frequency coil as a phase-shift full bridge.

6. The transmitter of claim 1, wherein the first and second inverters steer power between the inductive branch and capacitive branch of the RSN via amplitude and phase modulation.

7. The transmitter of claim 1, wherein the first and second dc-dc converters have adjustable output voltages.

8. The transmitter of claim 1, wherein the first and second inverters are phase-shifted against each other.

9. The transmitter of claim 1, wherein the first and second inverters are implemented as one of Class-E, Class-F, and Class-Φ inverters.

10. The transmitter of claim 1, wherein the first and second dc-dc converters are each implemented as a low frequency inverter coupled to a low pass filter.

11. The transmitter of claim 10, wherein the low frequency inverters are implemented as one of Class-D and full-bridge inverters.

12. The transmitter of claim 10, wherein the low pass filters are implemented as one of L-networks or π-networks.

13. The transmitter of claim 1, wherein the RSN is implemented as a three-port LC network.

14. The transmitter of claim 13, wherein the RSN comprises an inductor and a capacitor.

15. A dual-band multi-receiver (DBMR) wireless power transfer (WPT) system, comprising:
   a transmitter, comprising:
      a first dc-dc converter coupled to a first inverter;
      a second dc-dc converter coupled to a second inverter;
      a reactance steering network (RSN) coupled to the first and second inverters, the RSN comprising an inductive branch and a capacitive branch, wherein power is steered toward the inductive branch when load impedance is capacitive and power is steered toward the capacitive branch when load impedance is inductive;
a high frequency transmitting coil coupled to the RSN, the first and second inverters configured to drive the high frequency transmitting coil; and
a low frequency transmitting coil coupled to the first and second dc-dc converters, the first and second dc-dc converters configured to drive the low frequency coil; and
one or more receivers, comprising:
a high frequency receiving coil;
a low frequency receiving coil; and
a rectifier coupled to the high frequency receiving coil and low frequency receiving coil.

16. The system of claim 15, wherein the first and second dc-dc converters are configured to operate between about 90-200 kHz.

17. The system of claim 15, wherein the first and second inverters are configured to operate between about 6.78-27.12 MHz.

18. The system of claim 15, wherein the first and second dc-dc converters modulate inputs of the first and second inverters while simultaneously driving the low frequency coil.

19. The system of claim 15, wherein the first and second dc-dc converters drive the low frequency coil as a phase-shift full bridge.

20. The system of claim 15, wherein the first and second inverters steer power between the inductive branch and capacitive branch of the RSN via amplitude and phase modulation.

21. The system of claim 15, wherein the first and second dc-dc converters have adjustable output voltages.

22. The system of claim 15, wherein the first and second inverters are phase-shifted against each other.

23. The system of claim 15, wherein the first and second inverters are implemented as one of Class-E, Class-F, and Class-Φ inverters.

24. The system of claim 15, wherein the first and second dc-dc converters are each implemented as a low frequency inverter coupled to a low pass filter.

25. The system of claim 24, wherein the low frequency inverters are implemented as one of Class-D and full-bridge inverters.

26. The system of claim 24, wherein the low pass filters are implemented as one of L-networks or π-networks.

27. The system of claim 15, wherein the RSN is implemented as a three-port LC network.

28. The system of claim 27, wherein the RSN comprises an inductor and a capacitor.

29. The system of claim 15, wherein the rectifier is implemented as a dual-band rectifier.

30. The system of claim 15, wherein the rectifier comprises a switch for high frequency or low frequency mode selection.

31. The system of claim 30, wherein the rectifier further comprises two additional switches, two shunt capacitors, two chock inductors, and two filter capacitors.

32. The system of claim 15, wherein the rectifier functions as one of two Class-E half-wave rectifiers stacked in series and a Class-D rectifier based on a frequency mode selection.

* * * * *